US011062137B2

(12) United States Patent
Kurabayashi

(10) Patent No.: US 11,062,137 B2
(45) Date of Patent: Jul. 13, 2021

(54) SYSTEM, PORTABLE TERMINAL DEVICE, SERVER, PROGRAM, AND METHOD FOR VIEWING CONFIRMATION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 106 days.

(21) Appl. No.: 16/588,226

(22) Filed: Sep. 30, 2019

(65) Prior Publication Data

US 2020/0026921 A1    Jan. 23, 2020

Related U.S. Application Data

(63) Continuation of application No. PCT/JP2018/011978, filed on Mar. 26, 2018.

(30) Foreign Application Priority Data

Mar. 31, 2017   (JP) .............................. JP2017-071393

(51) Int. Cl.
   *G06K 9/00*   (2006.01)
   *G06K 9/42*   (2006.01)
   (Continued)

(52) U.S. Cl.
   CPC ........... *G06K 9/00664* (2013.01); *G06K 9/42* (2013.01); *G06K 9/4652* (2013.01);
   (Continued)

(58) Field of Classification Search
   CPC .... G06K 9/00664; G06K 9/42; G06K 9/4652; G06K 9/4661; G06K 9/6202; G06K 9/6215; G06Q 30/0224; G06T 7/00
   (Continued)

(56) References Cited

U.S. PATENT DOCUMENTS 10,262,427 B2 *  4/2019  Takahashi .............. G06Q 20/40
10,939,291 B1 *  3/2021  Koss ........................ G06F 21/36

FOREIGN PATENT DOCUMENTS

JP   2009-169586 A   7/2009
JP   2010-231450 A   10/2010
(Continued)

OTHER PUBLICATIONS

International Search Report issued Application No. PCT/JP2018/011978, dated Jun. 19, 2018 (3 pages).
(Continued)

*Primary Examiner* — Nancy Bitar
*Assistant Examiner* — Daniella M. DiGuglielmo
(74) *Attorney, Agent, or Firm* — Osha Bergman Watanabe & Burton LLP

(57) ABSTRACT

The system is for confirming that a user of a portable terminal device has viewed posted material in a plurality of places by visiting one of the posted places, the system including the portable terminal device and a server, the device including a portable-terminal control unit, a portable-terminal communication unit, an image capturing unit, a portable-terminal storage unit, and a position-information obtaining unit, the server including a server control unit, a server communication unit, and a server storage unit that stores authenticated images about the posted material in the individual posted places in association with position information of the posted places, wherein the portable-terminal control unit sends a viewing confirmation request including a viewed image, the normalization information, and the portable-terminal position information to the server by using the portable-terminal communication unit, and the server control unit determines whether the viewed image is valid on the basis of the request.

12 Claims, 11 Drawing Sheets

(51) Int. Cl.
  *G06K 9/46* (2006.01)
  *G06K 9/62* (2006.01)
  *G06Q 30/02* (2012.01)
  *G06T 7/00* (2017.01)
(52) U.S. Cl.
  CPC ......... *G06K 9/4661* (2013.01); *G06K 9/6202* (2013.01); *G06K 9/6215* (2013.01); *G06Q 30/0224* (2013.01); *G06T 7/00* (2013.01)
(58) Field of Classification Search
  USPC ........................................................ 382/103
  See application file for complete search history.

(56) References Cited

FOREIGN PATENT DOCUMENTS

| | | | | |
|---|---|---|---|---|
| JP | 2010231450 | A | * | 10/2010 |
| JP | 2011-60072 | A | | 3/2011 |
| JP | 2011060072 | A | * | 3/2011 |
| JP | 2013-552 | A | | 1/2013 |
| JP | 2016-62273 | A | | 4/2016 |
| JP | 2017-10284 | A | | 1/2017 |
| JP | 2017010284 | A | * | 1/2017 |

OTHER PUBLICATIONS

Written Opinion issued in International Application No. PCT/JP2018/011978, dated Jun. 19, 2018 (3 pages).

* cited by examiner (a)　　　(b)

(a)　　(b)　　(c)　　(d)　　(e)

FIG.12
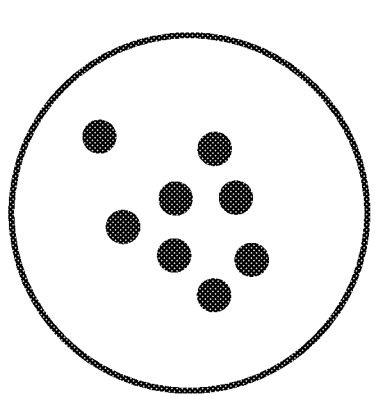
(a)
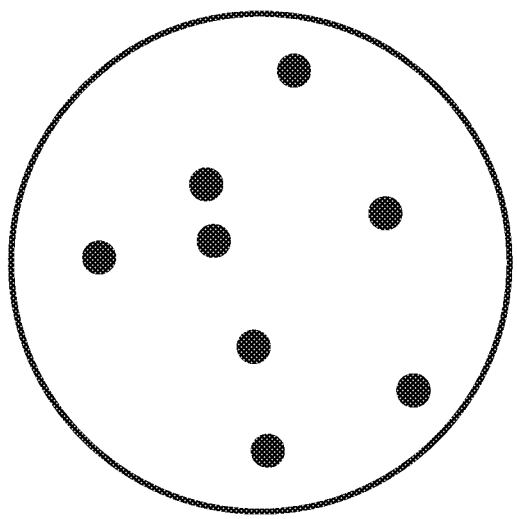
(b)
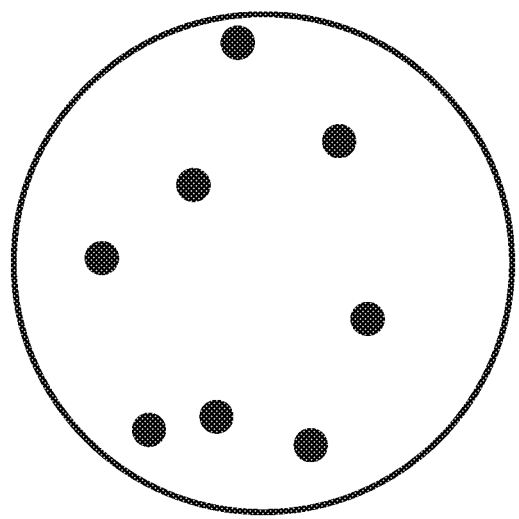
(c)
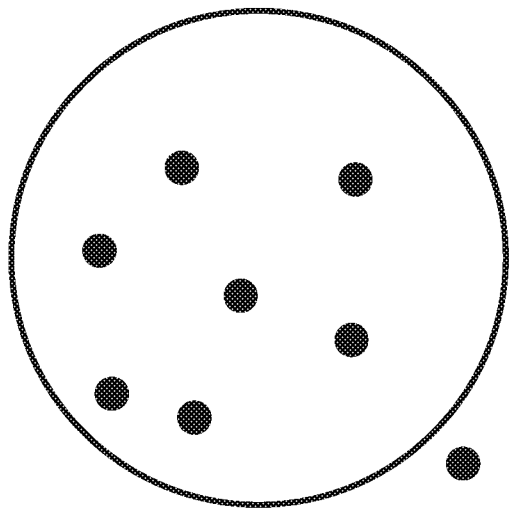
(d)

SYSTEM, PORTABLE TERMINAL DEVICE, SERVER, PROGRAM, AND METHOD FOR VIEWING CONFIRMATION

TECHNICAL FIELD

The present invention relates to systems, program, portable terminal devices, servers, and methods for confirming viewing of posted material.

BACKGROUND ART

There are known services for awarding those who have visited predetermined places, such as shops, with privileges at the shops or in online games. Patent Literature 1 discloses a system that awards a privilege when a specific video projected in a shop is captured with a portable terminal device. Patent Literature 2 discloses a system that executes check-in processing for identifying a position by using GPS and confirming a visit to a registered shop or the like and that provides points for a network game. Furthermore, Patent Literature 3 discloses a system that awards a privilege when a specific image is captured with a portable terminal device and the captured image is a correct image.

CITATION LIST

Patent Literature

{PTL 1}
Japanese Unexamined Patent Application, Publication No. 2016-062273
{PTL 2}
Japanese Unexamined Patent Application, Publication No. 2013-000552
{PTL 3}
Japanese Unexamined Patent Application, Publication No. 2009-169586

SUMMARY OF INVENTION

Technical Problem

When providing a service of awarding a user of a portable terminal device, who has visited a predetermined place, with a privilege for a shop, a game, or the like, it is possible to confirm the visit by the user by posting a poster or the like having a characteristic image printed thereon and letting the user capture an image thereof by using the portable terminal device and send the image to a server. However, it is readily possible to obtain an image of the poster captured by someone else, by copying or the like, and by sending the image to the server, it is possible to illegitimately obtain the privilege without actually visiting the posted place. Furthermore, in the case where the same posted material, printed in large volume, is posted in a plurality of places, with just an image in which the posted material is captured, it is not possible to identify in which place the posted material captured by the user is posted. By attaching two-dimensional codes for identifying places to posted materials, it becomes possible to identify the place where the captured image is posted. However, this makes it necessary to create different two-dimensional codes for the individual posted places and to attach the two-dimensional codes to the individual posted materials. This results in considerably increasing the unit price and requires changing the manufacturing and distribution routes of existing posted materials.

In the case where a system that identifies the position of a user or the like by using GPS is adopted, there is concern in that a malicious party might illegitimately obtain a privilege by tampering with position information as if the party visited a posted place although the party actually did not.

It is also possible to detect a visit to a predetermined place by a user by using a BLE (Bluetooth (registered trademark) Low Energy) beacon or near field radio communication (NFC). For example, an ultra-small device called a BLE beacon can broadcast a BLE advertising packet in which UUID or URL is embedded to the surroundings, causing a portable terminal device that has received the packet to perform an operation in accordance with the current position thereof. With NFC, a secure communication session is established in an ad-hoc fashion between a portable terminal device supporting NFC and an NFC reader. This makes it possible to readily realize a function for obtaining an authentication for viewing at a predetermined position just by bringing a portable terminal in proximity to an NFC reader, without requiring additional processing such as pairing.

However, BLE beacons or devices for NFC are expensive compared with printed matter, and the costs would be high in the case where thousands of devices are installed nationwide. Furthermore, with the BLE beacon system, it is possible to receive a beacon by using an illegitimate application and by way of sniffing, i.e., transferring the beacon onto a network, it becomes possible for a single device to act on behalf of a plurality of devices to obtain authentication for users who are present in remote places. Although NFC realizes mechanism with high security, portable terminal devices, such as smartphones, supporting NFC are limited. This makes it difficult to provide the service to a large number of users in the case where an NFC-based system is adopted. Furthermore, since NFC is used in settlement systems, there are users who hesitate to casually place their smartphones against NFC readers.

Solution to Problem

The present invention has been made in view of the situation described above and has the following features. Specifically, a system according to an aspect of the present invention is a system used to confirm that a user of a portable terminal device has viewed posted material posted in a plurality of places by visiting one of the posted places, the system including the portable terminal device and a server, the portable terminal device including a portable-terminal control unit, a portable-terminal communication unit, an image capturing unit, a portable-terminal storage unit, and a position-information obtaining unit, and the server including a server control unit, a server communication unit, and a server storage unit that stores authenticated images about the posted material in the individual posted places in association with position information of the posted places, and the portable-terminal control unit obtains portable-terminal position information by using the position-information obtaining unit; compares an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space;

captures a viewed image, which is an image of a space including the posted material captured within the area as well as a peripheral portion of the posted material, if it is determined that the posted material is captured within the area; generates, by comparing the image of the posted material in the viewed image with the reference-posted-material image for the posted material, normalization information for normalizing the viewed image with reference to the reference-posted-material image; and sends a viewing confirmation request including the viewed image, the normalization information, and the portable-terminal position information to the server by using the portable-terminal communication unit, and the server control unit receives the viewing confirmation request by using the server communication unit; determines whether or not the viewed image included in the viewing confirmation request has been tampered with; determines the viewing by the user as illegitimate viewing in the case where it is determined that the viewed image has been tampered with; generates a normalized image obtained by normalizing the viewed image on the basis of the normalization information in the case where it is determined that the viewed image has not been tampered with; selects one or more authenticated images corresponding to the viewed image from among the authenticated images stored in the server storage unit, on the basis of the portable-terminal position information and the position information associated with the authenticated images; compares the normalized image with the one or more selected authenticated images to compute similarities between the normalized image and the authenticated images; determines whether or not the viewed image is valid on the basis of the similarities; determines the viewing by the user as valid viewing in the case where it is determined that the viewed image is valid; and determines the viewing by the user as illegitimate viewing in the case where it is determined that the viewed image is not valid.

The generation of the normalization information by the portable-terminal control unit may include comparing the viewed image with the reference-posted-material image and generating position information indicating the position of the image of the posted material in the viewed image; the normalization information may include the position information; the authenticated images stored in the server storage unit may be normalized images of peripheral portions of the posted material; and the normalization based on the normalization information by the server control unit may include extracting the image of the peripheral portion of the posted material from the viewed image on the basis of the position information of the posted material.

The generation of the normalization information by the portable-terminal control unit may include computing the luminance and color differences between the images of the posted material in the reference-posted-material image and the viewed image and generating photometric correction information based on the computed luminance and color differences; the normalization information may include the photometric correction information; and the generation of a normalized image by the server control unit on the basis of the normalization information may include correcting the luminance and colors of the viewed image on the basis of the photometric correction information.

Furthermore, the computation of the similarities between the normalized image and the authenticated images by the server control unit may include dividing each of the viewed image and the authenticated images into two or more regions; computing the similarities between individual corresponding regions of the viewed image and the authenticated images as divided; and computing the similarities between the viewed image and the authenticated images on the basis of the similarities of the individual regions and weights assigned to the individual regions, and the weights may be determined on the basis of variations in similarity between the corresponding regions among the authenticated images.

Furthermore, the server control unit may store the normalized image as an authenticated image in the server storage unit in association with the position information of the posted place in the case where it is determined that the viewed image is valid on the basis of the similarities.

The portable-terminal storage unit may store images of two or more kinds of posted material in association with posted-material identification information indicating the kinds of posted material; the viewing confirmation request may further include the posted-material identification information of the posted material captured within the area; the authenticated images stored in the server storage unit may be associated with the posted-material identification information; and the selection of one or more authenticated images corresponding to the viewed image from among the authenticated images stored in the server storage unit may include selecting authenticated images associated with the posted-material identification information included in the viewing confirmation request.

A portable terminal device according to an aspect of the present invention is a portable terminal device used to confirm that a user of the portable terminal device has viewed posted material posted in a plurality of places by visiting one of the posted places, the portable terminal device including a portable-terminal control unit, a portable-terminal communication unit, an image capturing unit, a portable-terminal storage unit, and a position-information obtaining unit, and the portable-terminal control unit obtains portable-terminal position information by using the position-information obtaining unit; compares an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space; captures a viewed image, which is an image of a space including the posted material captured within the area as well as a peripheral portion of the posted material, if it is determined that the posted material is captured within the area; generates, by comparing the image of the posted material in the viewed image with the reference-posted-material image for the posted material, normalization information for normalizing the viewed image with reference to the reference-posted-material image; and sends a viewing confirmation request including the viewed image, the normalization information, and the portable-terminal position information to a server by using the portable-terminal communication unit.

A server according to an aspect of the present invention is a server used to confirm that a user of a portable terminal device has viewed posted material posted in a plurality of places by visiting one of the posted places, wherein the portable terminal device sends a viewing confirmation request including a viewed image, normalization information, and portable-terminal position information, the viewed image includes an image of posted material posted in a predetermined place as well as a peripheral portion thereof, the normalization information is information for normalizing the viewed image, the portable-terminal position information is information indicating the position of the portable terminal device, the server including a server control unit, a server communication unit, and a server storage unit that stores authenticated images about the posted material in the individual posted places in association with position information of the posted places, and the server control unit receives a viewing confirmation request including the viewed image, the normalization information, and the portable-terminal position information by using the server communication unit; determines whether or not the viewed image included in the viewing confirmation request has been tampered with; determines the viewing by the user as illegitimate viewing in the case where it is determined that the viewed image has been tampered with; generates a normalized image obtained by normalizing the viewed image on the basis of the normalization information in the case where it is determined that the viewed image has not been tampered with; selects one or more authenticated images corresponding to the viewed image from among the authenticated images stored in the server storage unit, on the basis of the portable-terminal position information and the position information associated with the authenticated images; compares the normalized image with the one or more selected authenticated images to compute similarities between the normalized image and the authenticated images; determines whether or not the viewed image is valid on the basis of the similarities; determines the viewing by the user as valid viewing in the case where it is determined that the viewed image is valid; and determines the viewing by the user as illegitimate viewing in the case where it is determined that the viewed image is not valid.

Furthermore, a program for a portable terminal device according to an aspect of the present invention is a program used to confirm that a user of a portable terminal device has viewed posted material posted in a plurality of places by visiting one of the posted places, the program causing the portable terminal device, including a portable-terminal communication unit, an image capturing unit, a portable-terminal storage unit, and a position-information obtaining unit, to execute a step of obtaining portable-terminal position information by using the position-information obtaining unit; a step of comparing an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space; a step of capturing a viewed image, which is an image of a space including the posted material captured within the area as well as a peripheral portion of the posted material, if it is determined that the posted material is captured within the area; a step of generating, by comparing the image of the posted material in the viewed image with the reference-posted-material image for the posted material, normalization information for normalizing the viewed image with reference to the reference-posted-material image; and a step of sending a viewing confirmation request including the viewed image, the normalization information, and the portable-terminal position information to a server by using the portable-terminal communication unit.

Furthermore, a program for a server according to an aspect of the present invention is a program used to confirm that a user of a portable terminal device has viewed posted material posted in a plurality of places by visiting one of the posted places, wherein the portable terminal device sends a viewing confirmation request including a viewed image, normalization information, and portable-terminal position information, the viewed image includes an image of posted material posted in a predetermined place as well as a peripheral portion thereof, the normalization information is information for normalizing the viewed image, the portable-terminal position information is information indicating the position of the portable terminal device, and the program causing a server, including a server communication unit and a server storage unit that stores authenticated images about the posted material in the individual posted places in association with position information of the posted places, to execute a step of receiving a viewing confirmation request including the viewed image, the normalization information, and the portable-terminal position information by using the server communication unit; a step of determining whether or not the viewed image included in the viewing confirmation request has been tampered with; a step of determining the viewing by the user as illegitimate viewing in the case where it is determined that the viewed image has been tampered with; a step of generating a normalized image obtained by normalizing the viewed image on the basis of the normalization information in the case where it is determined that the viewed image has not been tampered with; a step of selecting one or more authenticated images corresponding to the viewed image from among the authenticated images stored in the server storage unit, on the basis of the portable-terminal position information and the position information associated with the authenticated images; a step of comparing the normalized image with the one or more selected authenticated images to compute similarities between the normalized image and the authenticated images; determining whether or not the viewed image is valid on the basis of the similarities; a step of determining the viewing by the user as valid viewing in the case where it is determined that the viewed image is valid; and a step of determining the viewing by the user as illegitimate viewing in the case where it is determined that the viewed image is not valid.

A method executed by a portable terminal according to an aspect of the present invention is a method used to confirm that a user of a portable terminal device has viewed posted material posted in a plurality of places by visiting one of the posted places, the method being executed by the portable terminal device, including a portable-terminal communication unit, an image capturing unit, a portable-terminal storage unit, and a position-information obtaining unit, the method including a step of obtaining portable-terminal position information by using the position-information obtaining unit; a step of comparing an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space; a step of capturing a viewed image, which is an image of a space including the posted material captured within the area as well as a peripheral portion of the posted material, if it is determined that the posted material is captured within the area; a step of generating, by comparing the image of the posted material in the viewed image with the reference-posted-material image for the posted material, normalization information for normalizing the viewed image with reference to the reference-posted-material image; and a step of sending a viewing confirmation request including the viewed image, the normalization information, and the portable-terminal position information to a server by using the portable-terminal communication unit.

A method executed by a server according to an aspect of the present invention is a method used to confirm that a user of a portable terminal device has viewed posted material posted in a plurality of places by visiting one of the posted places, the method being executed by a server, wherein the portable terminal device sends a viewing confirmation request including a viewed image, normalization information, and position information of the posted material included in the viewed image, the position information being based on portable-terminal position information, the viewed image includes an image of posted material posted in a predetermined place as well as a peripheral portion thereof, the normalization information is information for normalizing the viewed image, the portable-terminal position information is information indicating the position of the portable terminal device, and the server includes a server communication unit and a server storage unit that stores authenticated images about the posted material in the individual posted places in association with position information of the posted places, the method including a step of receiving a viewing confirmation request including the viewed image, the normalization information, and the portable-terminal position information by using the server communication unit; a step of determining whether or not the viewed image included in the viewing confirmation request has been tampered with; a step of determining the viewing by the user as illegitimate viewing in the case where it is determined that the viewed image has been tampered with; a step of generating a normalized image obtained by normalizing the viewed image on the basis of the normalization information in the case where it is determined that the viewed image has not been tampered with; a step of selecting one or more authenticated images corresponding to the viewed image from among the authenticated images stored in the server storage unit, on the basis of the portable-terminal position information and the position information associated with the authenticated images; a step of comparing the normalized image with the one or more selected authenticated images to compute similarities between the normalized image and the authenticated images; determining whether or not the viewed image is valid on the basis of the similarities; a step of determining the viewing by the user as valid viewing in the case where it is determined that the viewed image is valid; and a step of determining the viewing by the user as illegitimate viewing in the case where it is determined that the viewed image is not valid.

Advantageous Effects of Invention

The present invention makes it possible to inexpensively realize a viewing confirmation system for preventing a user having malicious intent from getting authenticated illegitimately. The present invention has high tamper resistance for preventing fraud and allows the usage of posted materials that can be easily copied, such as posters, which enables inexpensive implementations. Furthermore, since portable terminal devices used in the present invention do not require special functions, it is possible to provide a viewing confirmation service to a large number of users. With a configuration in which an image once authenticated is registered in a server as an authenticated image, the viewing confirmation system grows autonomously, which serves to realize cheat detection with higher accuracy.

BRIEF DESCRIPTION OF DRAWINGS

FIG. 12 is an illustration schematically showing cohesiveness among authenticated images for individual regions according to the embodiment of the present invention.

DESCRIPTION OF EMBODIMENTS

Figure 1:
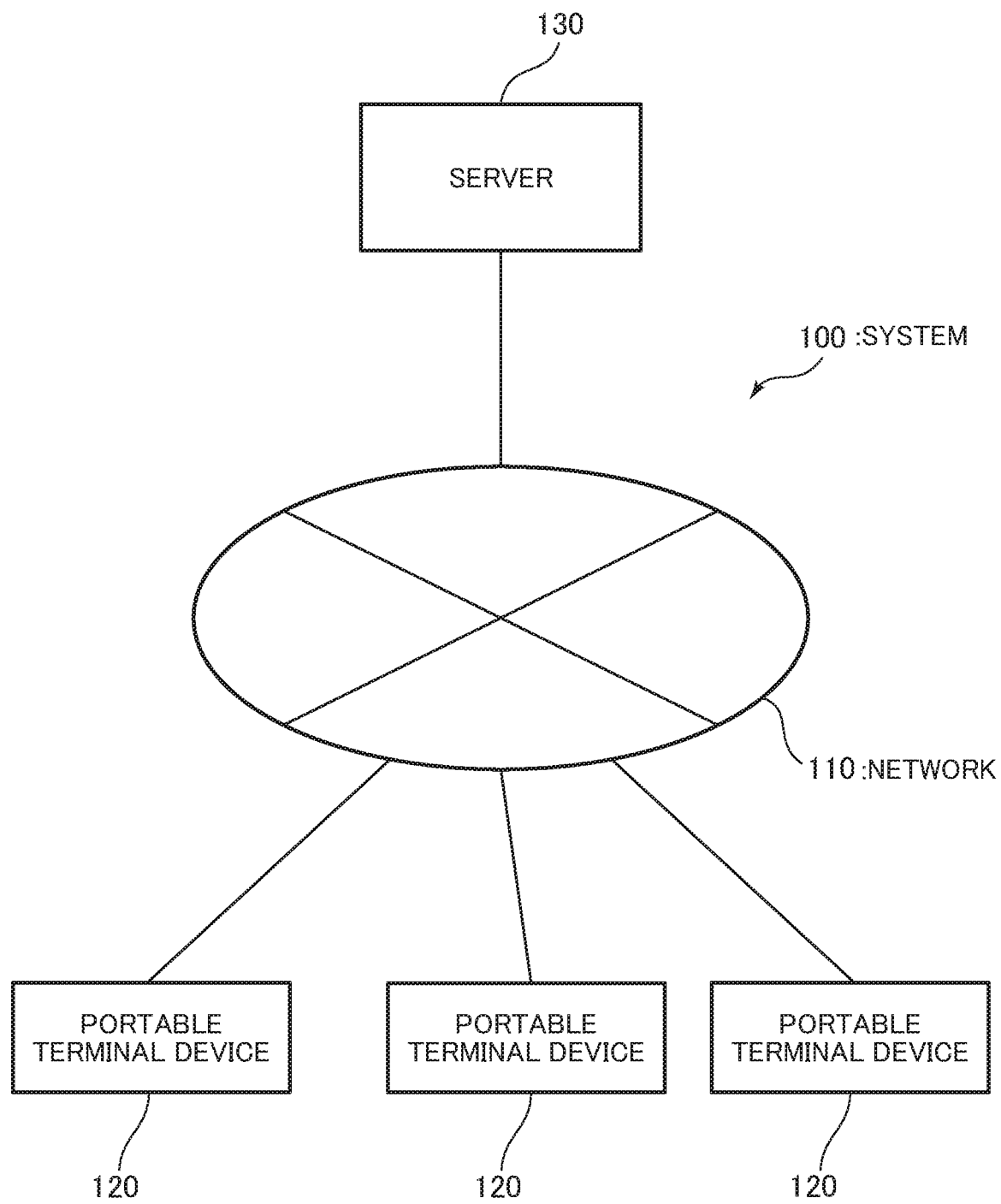
FIG. 1 shows the overall configuration of a system according to an embodiment of the present invention.

An embodiment of the present invention will be described below with reference to the drawings. As shown in FIG. 1, a viewing confirmation system 100 according to this embodiment can be realized by a system including one or more portable terminal devices 120 and a server 130 connected via a network 110.

Each of the portable terminal devices 120 in this embodiment is a device that captures an image of posted material and that sends the image to the server 130 via the network 110. The portable terminal device 120 may be a portable device such as a mobile phone, a smartphone, a tablet terminal, a portable game machine, or a digital camera. The portable terminal device 120 includes a processing device 201, a display device 202, an input device 203, an image-capturing device 204, a position-information obtaining device 205, a storage device 206, a communication device 207, and a bus 208. The storage device 206 stores programs 209.

The processing device 201 executes applications, such as a web browser, and executes various kinds of processing, such as image processing, on the basis of the programs 209, input data from the input device 203, captured-image data from the image-capturing device 204, data received from the position-information obtaining device 205 or the communication device 207, etc. The processing device 201 includes a processor that controls the individual devices included in the portable terminal device 120, and executes various kinds of processing by using a register included in the processor or the storage device 206 as a work area. These components are connected via the bus 208; alternatively, however, the components may be connected individually as needed.

The display device (display) 202 displays application screens or images captured by the image-capturing device 204 under the control of the processing device 201. The display device 202 is preferably a liquid crystal display but may be an organic-EL-based display, a plasma display, or the like.

The input device 203 is a device having the functionality for accepting input from a user, such as a touchscreen, a touchpad, or input buttons. In the case where the portable terminal device 120 includes a touchscreen as the input device 203, the touchscreen also functions as the display device 202, and the display device 202 and the input device 203 are constructed in an integrated form. The display device 202 and the input device 203 may be disposed at separate positions in separate forms. The image-capturing device 204 captures a still picture or a moving picture of a real space region. The position-information obtaining device 205 is a device that obtains information indicating the current position of the portable terminal device, and may be, for example, a GPS sensor or a device that identifies the position on the basis of a WiFi SSID or the like.

The storage device 206 includes a hard disk, a main memory, and a buffer memory. Alternatively, any type of non-volatile storage or non-volatile memory that is capable of storing information, which may be of the removable type, may be used in place of the hard disk. For example, in the case where the portable terminal device 120 is a smartphone, the storage device 206 includes a ROM and a RAM. The storage device 206 stores the programs 209 and various kinds of data that can be referred to as the programs are executed. The programs 209 may include an operating system as well as programs and data for any kind of application requiring input from a player, such as a video game or a web browser.

The communication device 207 carries out wireless communications such as mobile communications or wireless LAN communications or wired communications via an Ethernet (registered trademark) cable, a USB cable, or the like. The communication device 207 makes it possible to download programs from the server 130 and to store the programs in the storage device 206. Alternatively, programs may be stored in an optical disk such as a CD or a DVD, and by connecting an optical drive to the communication device 207, programs, etc. may be read from the optical disk and stored in the storage device 206.

Figure 3:
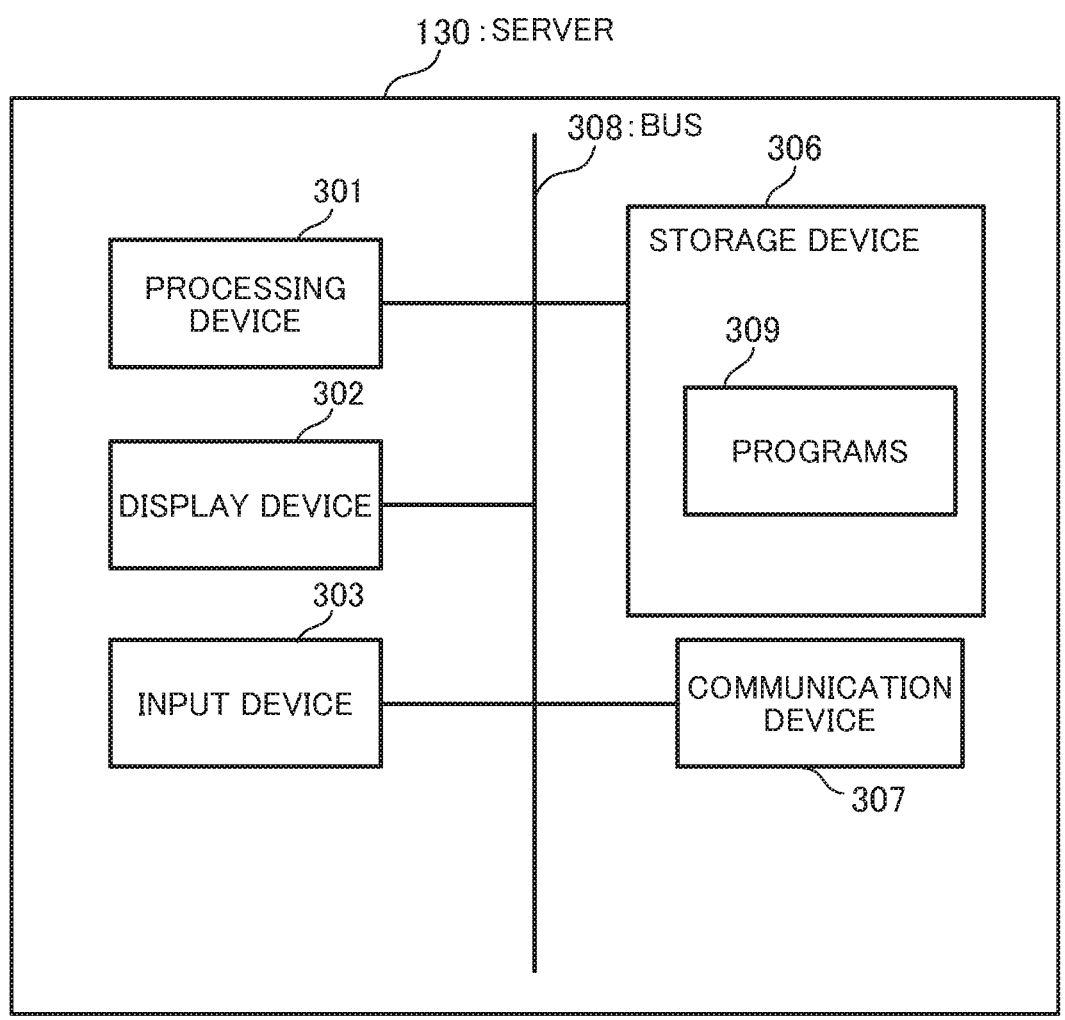
FIG. 3 is a hardware configuration diagram of a server according to the embodiment of the present invention.

FIG. 3 is a block diagram showing the hardware configuration of the server 130 according to this embodiment. The server 130 includes a processing device 301, a display device 302, an input device 303, a storage device 306, and a communication device 307. These components are connected via a bus 308; alternatively, the components may be connected individually as needed.

The processing device 301 includes a processor that controls the individual devices included in the server 130, and executes various kinds of processing by using the storage device 306 as a work area. The display device 302 has the functionality of displaying information to a user of the server. The input device 303 is a device having the functionality of accepting input from the user, such as a keyboard or a mouse.

The storage device 306 includes a hard disk, a main memory, and a buffer memory. The hard disk stores programs 309. Alternatively, any type of non-volatile storage or non-volatile memory that is capable of storing information, which may be of the removable type, may be used in place of the hard disk. The storage device 306 stores the programs 309 and various kinds of data that can be referred to as the programs are executed.

The communication device 307 carries out wired communications via an Ethernet (registered trademark) cable or the like or wireless communications such as mobile communications or wireless LAN communications to connect to the network 110.

Figure 4:
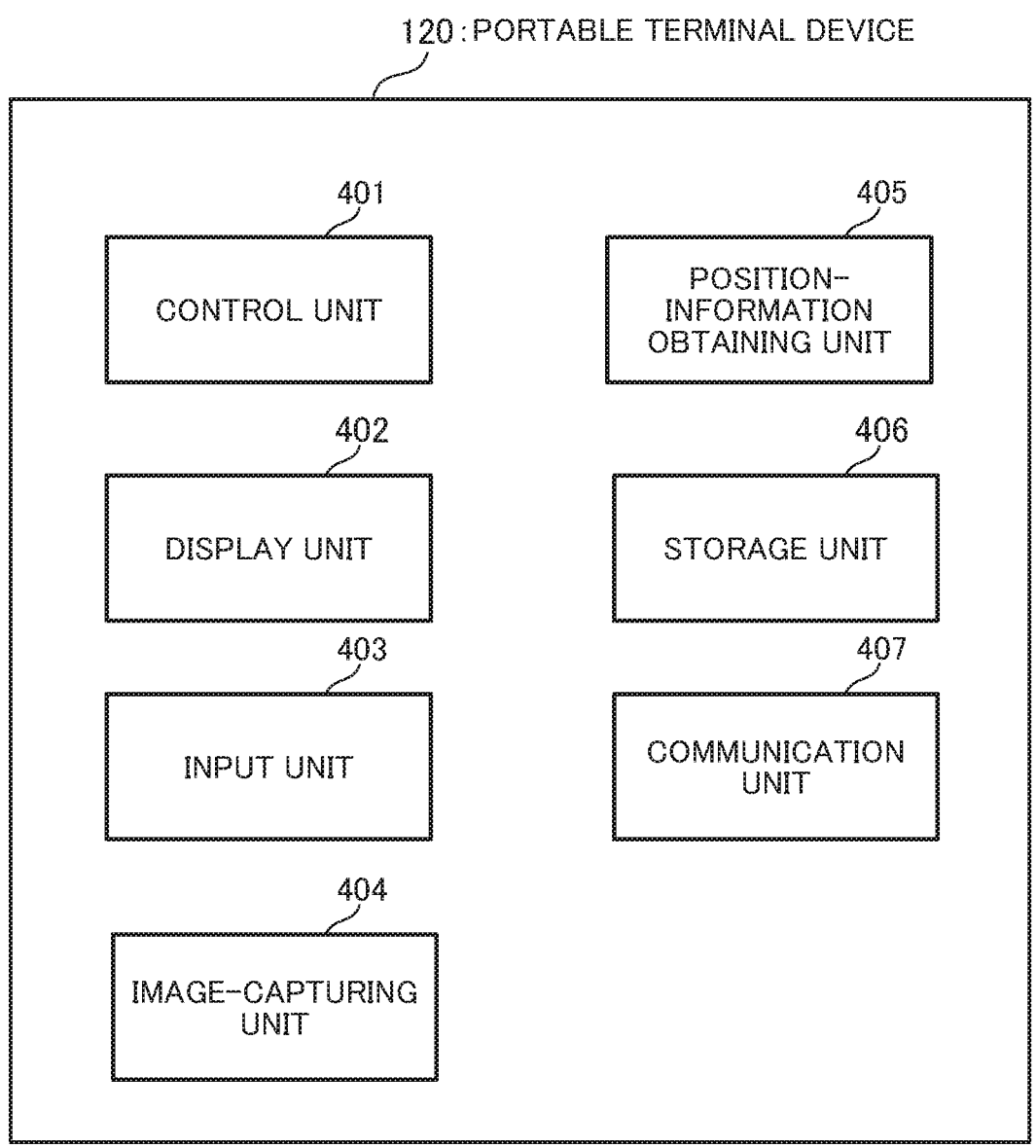
FIG. 4 is a functional block diagram of the portable terminal device according to the embodiment of the present invention.

FIG. 4 shows an example of the functional block diagram of the portable terminal device 120 according to the present invention. The portable terminal device 120 includes a portable-terminal control unit 401, a portable-terminal display unit 402, a portable-terminal input unit 403, an image-capturing unit 404, a position-information obtaining unit 405, a portable-terminal storage unit 406, and a portable-terminal communication unit 407.

The portable-terminal display unit 402 displays information to be presented to the user. The portable-terminal input unit 403 accepts input from the user. The image-capturing unit 404 captures a still picture or a moving picture of a real space region. The position-information obtaining unit 405 obtains current position information of the portable terminal device 120.

The portable-terminal storage unit 406 stores a reference-posted-material image, which is an image of posted material posted in a predetermined posted place, in association with posted-material identification information (ID) indicating the kind of posted material. Although it is assumed that there are multiple kinds of posted material in this embodiment, the kind of posted material may be only one kind. In the case where there is only one kind of reference-posted-material image, it is not necessary to store the reference-posted-material image in association with a posted-material ID. It is possible to download the reference-posted-material image from the server 130 to the storage unit 406 of the portable terminal device 120, for example, as included in a viewing confirmation application. It is possible to update the reference-posted-material image stored in the portable-terminal storage unit 406 at predetermined timings on the basis of information received from the server 130 via the communication unit 407. For example, it is possible to download and update the reference-posted-material image at the timing of updating of a game event for awarding a privilege or at regular intervals. By using a web browser as a viewing confirmation application, the reference-posted-material image may be downloaded when a website for photographing a viewed image is accessed.

The portable-terminal control unit 401 obtains portable-terminal position information by using the position-information obtaining unit 405, and compares the reference-posted-material image stored in the portable-terminal storage unit 406 with an image of a space captured by the image-capturing unit 404 to determine whether or not the posted material in the reference-posted-material image is captured within a predetermined area in the image of the captured space. Then, when it is determined that the posted material is captured within the predetermined area, the portable-terminal control unit 401 captures a viewed image, which is an image of the space including the posted material captured within the predetermined area as well as a peripheral region of the posted material, compares the reference-posted-material image for this posted material with the image of the posted material in the captured viewed image to generate normalization information for normalizing the viewed image with reference to the reference-posted-material image, and sends a viewing confirmation request including the viewed image, the normalization information, and the portable-terminal position information to the server 130 via the network 110 by using the portable-terminal communication unit 407. In this embodiment, the kind of posted material included in the image captured by the image-capturing unit 404 is identified, and a posted-material ID for the identified kind is included in the viewing confirmation request.

Figure 2:
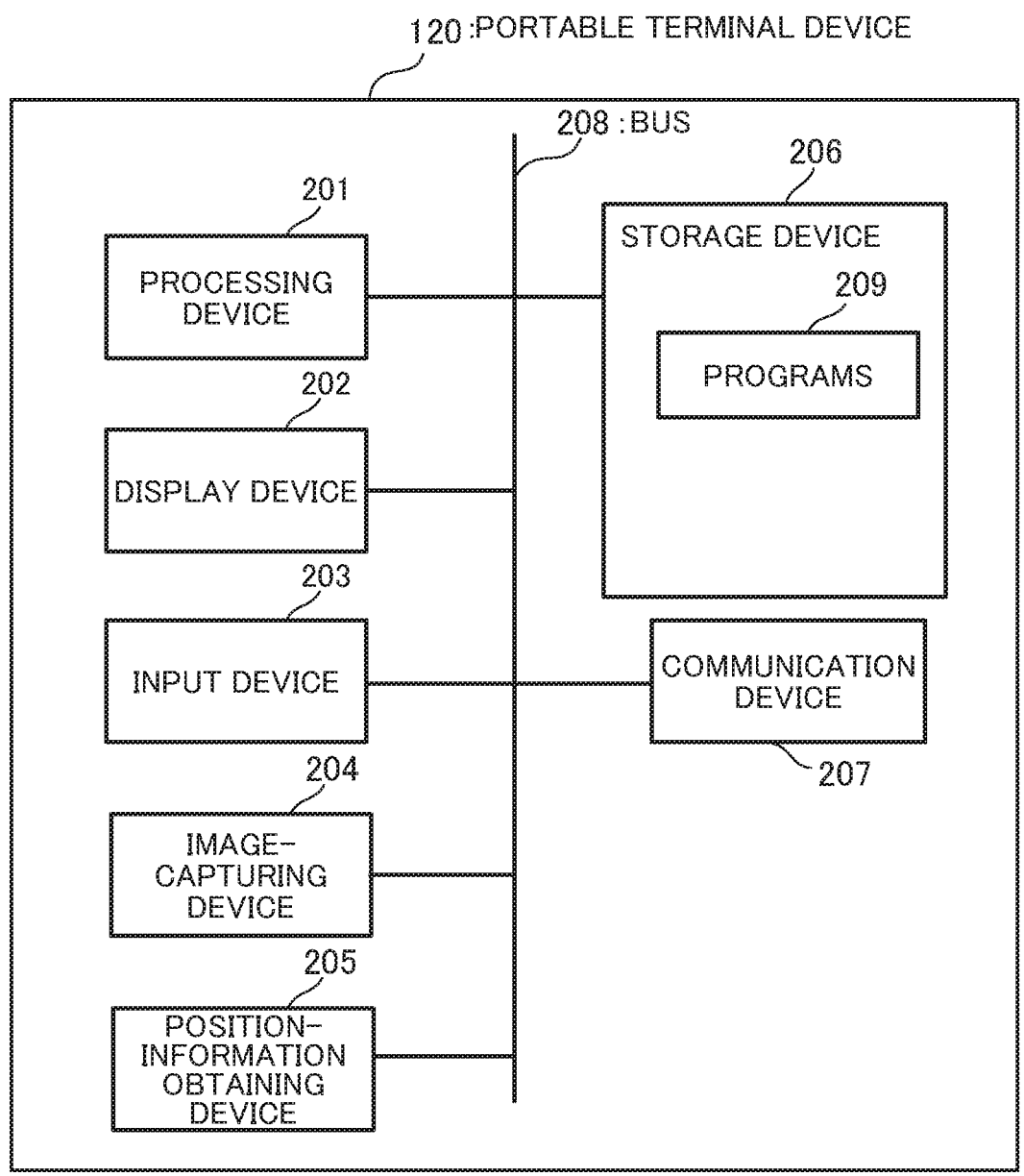
FIG. 2 is a hardware configuration diagram of a portable terminal device according to the embodiment of the present invention.

In this embodiment, the portable-terminal control unit 401 is realized by the programs 209, included in the hardware configuration shown in FIG. 2, being executed by the processing device 201, but may also be realized by preparing an integrated circuit or the like. Furthermore, the portable-terminal display unit 402, the portable-terminal input unit 403, the image-capturing unit 404, the position-information obtaining unit 405, the portable-terminal storage unit 406, and the portable-terminal communication unit 407 are respectively realized by the individual hardware of the display device 202, the input device 203, the image-capturing device 204, the position-information obtaining device 205, the storage device 206, and the communication device 207 shown in FIG. 2, but may also be realized by the programs 209 being executed by the processing device 201, etc. so as to cooperate with the individual hardware.

Figure 5:
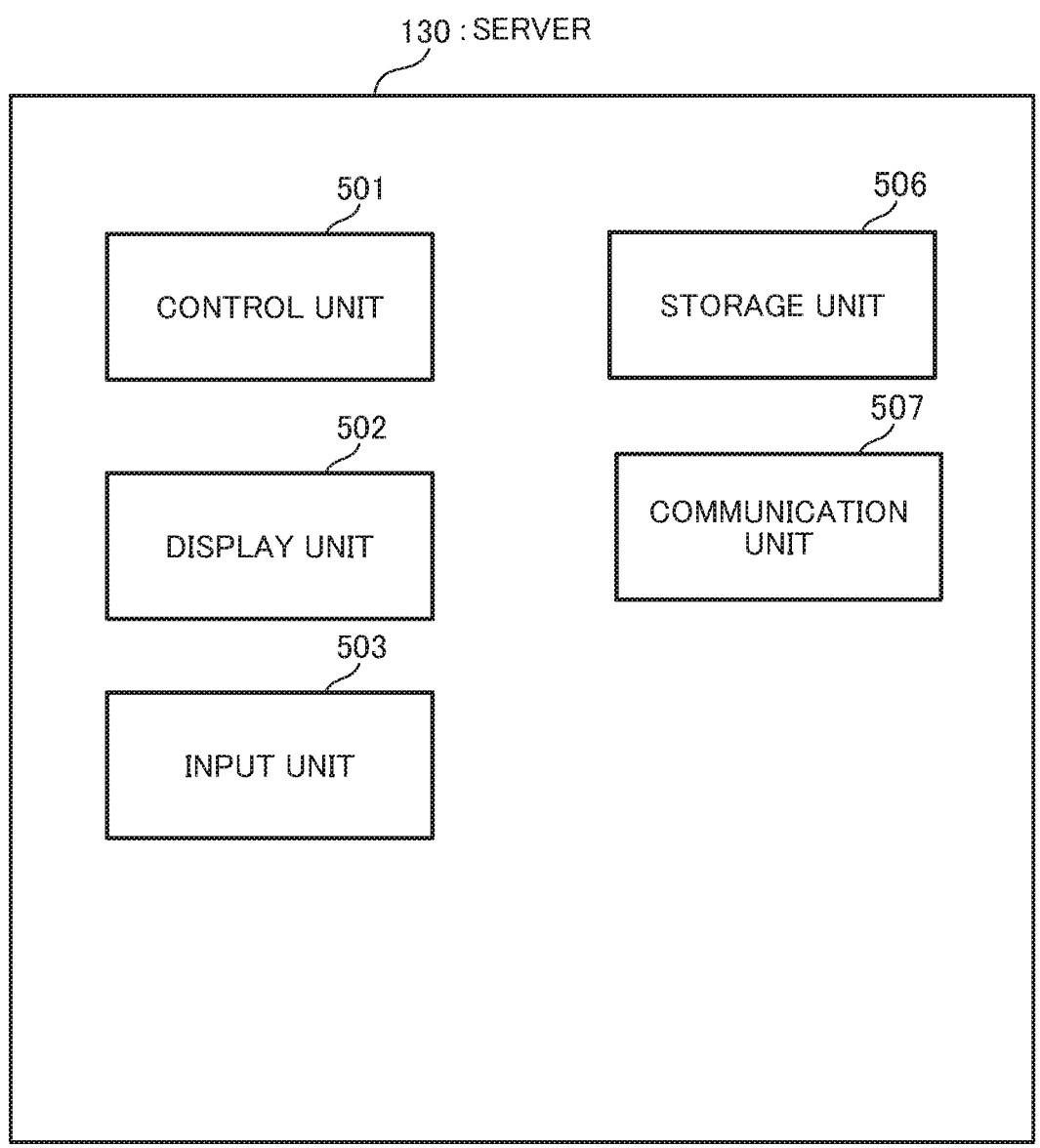
FIG. 5 is a functional block diagram of the server according to the embodiment of the present invention.

FIG. 5 shows an example of the functional block diagram of the server 130 according to the present invention. The server 130 includes a server control unit 501, a server display unit 502, a server input unit 503, a server storage unit 506, and a server communication unit 507.

The server display unit 502 displays information to be presented to the user of the server. The server input unit 503 accepts input from the user. The server storage unit 506 stores reference-posted-material images, which are images of posted materials posted in predetermined posted places, in association with posted-material IDs. In the case where there is only one kind of reference-posted-material image, it is not necessary to store the reference-posted-material image in association with a posted-material ID. Furthermore, the server storage unit 506 also stores one or more authenticated images, which are normalized images of viewed images determined as being valid. Each authenticated image is stored in association with position information of the posted place of the posted material included in that authenticated image. As the position information of the posted place, position information obtained by the portable terminal device 120 when the viewed image was captured may be used, or the position information of another authenticated image that is stored may be used. The position information of an authenticated image that is stored initially may be entered by an administrator. The server communication unit 507 sends and receives information in a wired or wireless fashion.

The server control unit 501, in response to a request from the portable terminal device 120, sends a reference-posted-material image stored in the storage unit 506, together with the associated posted-material ID, to the portable terminal device 120 via the communication unit 507. Furthermore, it is possible to read a reference-posted-material image from the storage unit 506, send the reference-posted-material image to the portable terminal device 120, and update the reference-posted-material image in the portable terminal device 120 at predetermined timings, such as the timings at which the reference-posted-material image is updated.

The server control unit 501, by using the server communication unit 507, receives the viewing confirmation request sent from the portable terminal device 120, determines whether or not the viewed image included in the received viewing confirmation request has been tampered with, and determines the viewing by the viewer as being illegitimate viewing in the case where it is determined that the viewed image has been tampered with. In the case where it is determined that the viewed image has not been tampered with, the viewed image is normalized on the basis of the normalization information to generate a normalized image, and one or more authenticated images corresponding to the viewed image are selected from the authenticated images stored in the server storage unit 506 on the basis of the position information included in the viewing confirmation request and the position information associated with the authenticated images. In this embodiment, the authenticated images are selected also on the basis of the posted-material ID included in the viewing confirmation request and the posted-material IDs stored in the server storage unit 506. The normalized image is compared with the one or more selected authenticated images to compute similarities between the normalized image and the authenticated images, thereby determining whether the viewed image is valid on the basis of the similarities. The viewing by the user is determined as being valid viewing in the case where the viewed image is determined as being valid, and the viewing by the user is determined as being illegitimate viewing in the case where the viewed image is determined as not being valid.

In this embodiment, the server control unit 501 is realized by the programs 309, included in the hardware configuration shown in FIG. 3, being executed by the processing device 301, but may also be realized by preparing an integrated circuit or the like. Furthermore, the server display unit 502, the server input unit 503, the server storage unit 506, and the server communication unit 507 are respectively realized by the individual hardware of the display device 302, the input device 303, the storage device 306, and the communication device 307 shown in FIG. 3, but may also be realized by the programs 309 being executed by the processing device 301, etc. so as to cooperate with the individual hardware.

Figure 6:
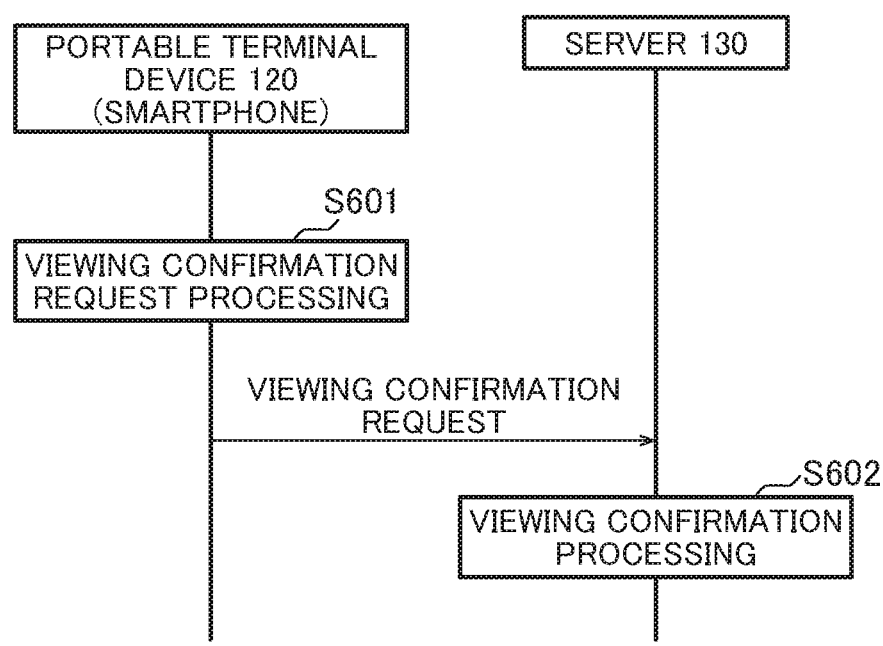
FIG. 6 is a flowchart showing information processing according to the embodiment of the present invention.

Next, FIG. 6 shows a flowchart of the operation of the portable terminal device 120 and the server 130 in this embodiment. This embodiment will be described in the context of an example where the user of the smartphone acting as the portable terminal device 120 is required to view a poster, which is posted material posted in a plurality of places, in order to obtain an item in an online game that the user is playing. The user actually visits a place where the poster is posted, captures an image of the poster by using a viewing confirmation application, and sends the image to the server 130. When the image is authenticated as being a valid viewed image at the server 130, it is acknowledged that the user has actually visited the place and viewed the poster, and the item is distributed to the game account of the user. Although the posted material is a poster printed on paper in this embodiment, the posted material may be a display device such as a liquid crystal panel or a signboard that is posted to present information or the like.

First, in this embodiment, the user downloads and installs the viewing confirmation application as a program 209 and visits one of the posted places to view the poster. When the user has activated the viewing confirmation application on the portable terminal device 120 in order to capture an image of the poster, the portable terminal device 120 starts viewing confirmation request processing (S601). In the viewing confirmation request processing, the control unit 401 of the portable terminal device 120 captures an image of the poster and the peripheral region thereof as a viewed image by using the image-capturing unit 404 and sends a viewing confirmation request including this viewed image to the server 130 via the communication unit 407.

The server 130 receives the viewing confirmation request and executes viewing confirmation processing (S602). In the viewing confirmation processing, the server 130 determines whether or not the viewing by the user is illegitimate. The viewing is determined as being illegitimate viewing in the case where the user issued a viewing conformation request as if the user had visited the posted place even though the user actually didn't. The viewing is determined as being valid viewing in the case where the user actually visited the place where the posted material is posted, viewed the posted material, and then issued a viewing confirmation request. The server executes processing on the basis of the result of determination as to whether or not the viewing is illegitimate.

Figure 7:
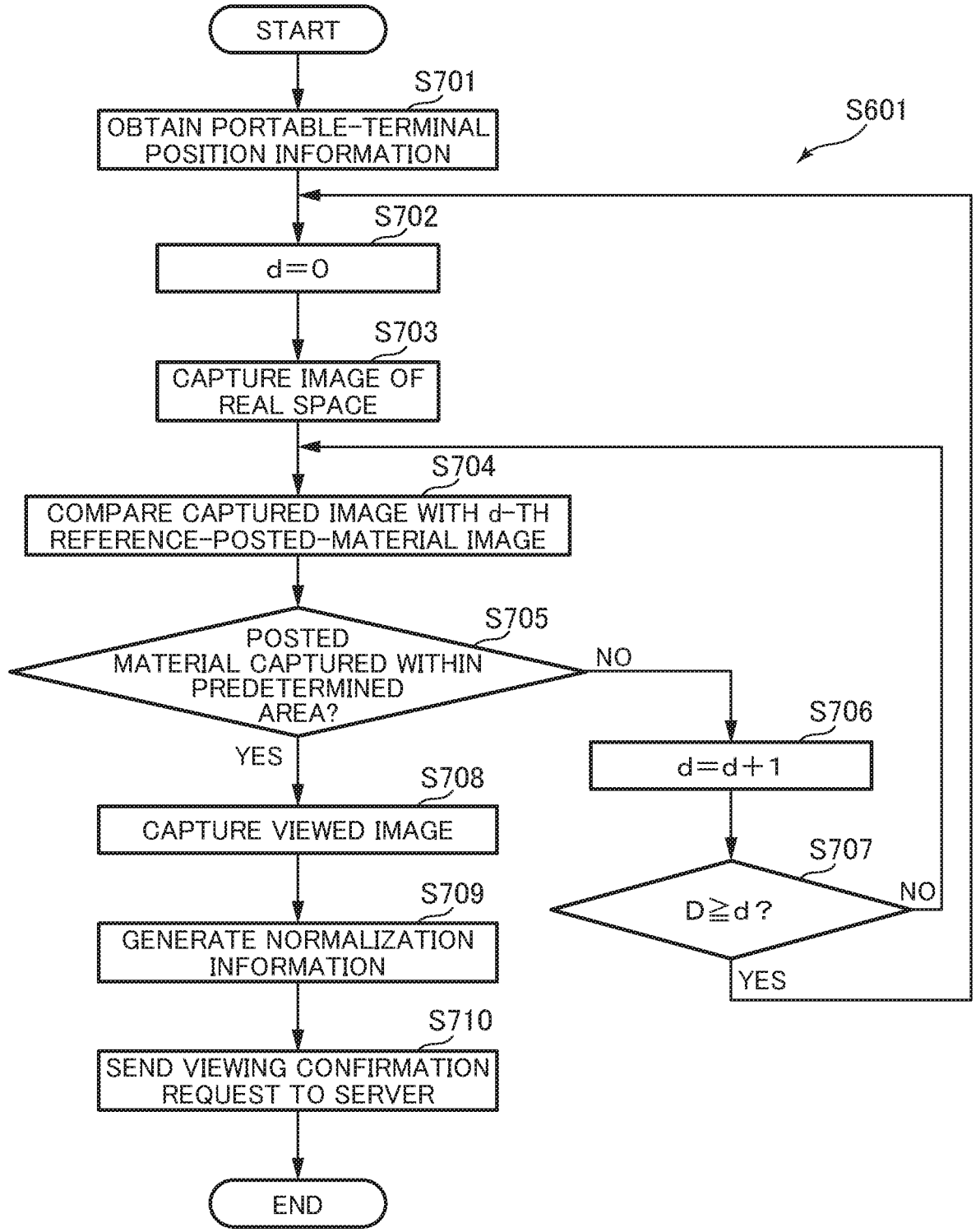
FIG. 7 is a flowchart showing information processing by the portable terminal device according to the embodiment of the present invention.

FIG. 7 shows more specific processing in the viewing confirmation request processing (S601) in this embodiment. The viewing confirmation request processing is started when the user activates the viewing confirmation application on the portable terminal device 120.

The portable-terminal control unit 401 obtains current position information of the portable terminal device 120 by using the position-information obtaining unit 405 (S701) and sets a counter d for reference-posted-material images to 0 (S702). In this embodiment, the storage unit 406 stores D reference-posted-material images, and it is sequentially checked whether one of the reference-posted-material images is included in the image captured by the user. The reference-posted-material images are used as subjects of comparison, for example, in order of the memory addresses where the images are stored.

The user attempts to capture an image of the poster while directing the image-capturing unit 404 of the portable terminal device 120 toward the poster. The image-capturing unit 404 captures a real space in the facing direction (S703). Then, the captured image of the space captured by the image-capturing unit 404 is compared with the d-th (0≤d<D) reference-posted-material image among the reference-posted-material images stored in the storage unit 406 (S704), and it is determined whether or not the posted material (poster) in one of the reference-posted-material images is captured within a predetermined area in the image of the captured space (S705). The predetermined area within which the poster is to be captured is defined to be an area smaller than the entire region that can be captured by the image-capturing unit 404. Thus, the image-capturing unit 404 captures an image of the poster within the predetermined area while simultaneously capturing an image of the peripheral region of the poster.

It is difficult to determine whether a poster image captured by the user is a poster image obtained by copying or a poster image captured by actually visiting the posted place just by comparing the user's image with a poster image already approved as being valid. Furthermore, in the case where the same poster is posted in a plurality of places, captured images of the poster posted in different posted places become substantially the same image. Thus, it is not possible to prevent a user who visited one of the posted places and captured a viewed image from using this viewed image as a viewed image for other posted places. However, images including the periphery of the poster do not become exactly the same image if the time of photographing varies, for example, because passersby are included or the positions of shades change. Furthermore, since the peripheral region of the poster varies among the individual places where the poster is posted, images including the peripheral region of the poster varies among the individual posted places. Thus, in the present invention, an image of a poster together with a peripheral region of the poster is captured. This makes it possible to determine whether or not a viewed image is an image obtained by copying and to determine valid viewed images distinctly for individual image-capturing places.

In the case where it is determined that the posted material in the d-th reference-posted-material image is not captured within the predetermined area in the image of the captured space (S705), the counter d is counted up (S706), and it is determined whether the captured image has been compared with all the reference-posted-material images subject to determination (S707). In the case where the determination has not been performed for all, it is determined whether the posted material in the next reference-posted-material image is captured in the captured image (S704 and S705). In the case where it is determined that the captured image has been compared with all the reference-posted-material images (S707), the counter d is reset (S702), an image of a new space is captured (S703), and comparison of the captured image with the reference-posted-material images is executed. The processing in S702 to S705 is executed repeatedly until it is determined that the posted material in one of the reference-posted-material images is captured within the predetermined area in the image of the captured space.

Figure 8:
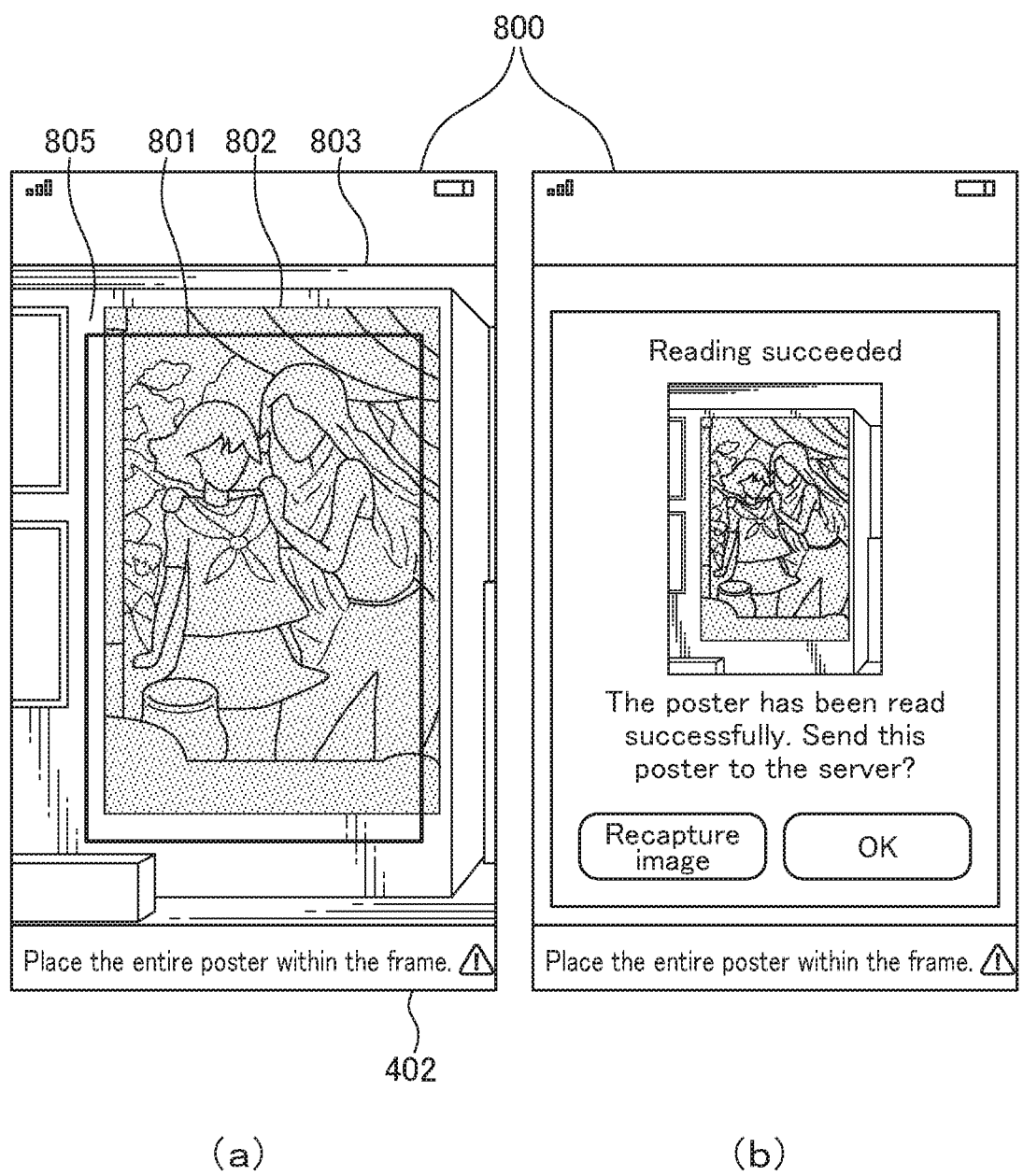
FIG. 8 is an illustration showing an example of displayed screen according to the embodiment of the present invention.

FIG. 8 shows, as an example, a display screen 800 of the viewing confirmation application displayed on the display unit 402. As shown in part (a) of FIG. 8, the display unit 402 displays a frame 801 indicating the predetermined area within which a poster 802 is to be accommodated and a message instructing that the entire poster should be placed within the frame, together with an image of a space captured by the image-capturing unit 404. Here, the display unit 402 displays the entire image-capturing region 803 of the image-capturing unit 404, and the frame 801 constitutes an area smaller than the entire region. Thus, when the poster 802 is accommodated within the frame 801, an image 805 of the periphery of the poster 802 is displayed in the region outside the frame 801. The user moves the portable terminal device 120 according to the instruction to accommodate the poster within the frame 801. This makes it possible to obtain a captured image in which the relative positional relationship between the poster image and the peripheral image is fixed. That is, it is possible to perform geometric normalization.

The processing for determining whether or not the posted material in a reference-posted-material image is captured within the predetermined area in an image of a captured space (S704 and S705) can be realized, for example, by using the key point matching technique based on ORB (Oriented FAST and Rotated BRIEF) feature quantities. Specifically, characteristic points (key points) in each reference-posted-material image are detected and are stored in advance in the storage unit 406 as a part of the viewing confirmation application. Then, the prestored characteristic points (key points) in the reference-posted-material image are superimposed in the predetermined area (frame 801), and in the case where the characteristic points of an image captured by the image-capturing unit 404 overlap the characteristic points superimposed in the predetermined area, it is determined that the posted material in the reference-posted-material image is captured within the predetermined area in the image of the captured space. There is no need for complete overlapping between the characteristic points of the reference-posted-material image and the characteristic points of the captured image. For example, it is possible to determine that the posted material is captured within the predetermined area in the case where a predetermined number of characteristic points overlap within a predetermined deviation range.

When the user succeeds to accommodate the poster within the predetermined area by moving the portable terminal device 120, it is determined that the poster in the reference-posted-material image is captured within the predetermined area in the image of the captured space (S705), and the image of the space including the poster captured within the predetermined area as well as a peripheral region thereof is captured as a viewed image for the subsequent processing (S708). In this embodiment, the posted-material ID associated with the reference-posted-material image for the poster determined as being captured in the viewed image is identified. In this embodiment, since each portable terminal device executes processing for identifying the kind of posted material, the load is distributed to the individual portable terminal devices even in the case where a large number of viewing confirmation requests are issued simultaneously, which serves to reduce the load on the server.

In this embodiment, the processing for capturing an image captured when the poster is accommodated within the predetermined frame as a viewed image is automatically executed by the portable terminal device 120 without depending on input from the user, and the processing proceeds to a step of generating normalization information for this viewed image (S709). As shown in part (b) of FIG. 8, the display unit 402 may display a message for notifying the user of successful capturing of a viewed image as well as a message for querying whether to send the viewed image to the server to send a viewing confirmation request or to recapture an image, the processing returning to S702 in the case where an input for recapturing an image is received by the input unit 403 and proceeding to the next step (S709) in the case where an input for sending the viewed image to the server 130 is received.

In S709, the poster image in the viewed image is compared with the reference-posted-material image for the poster to generate normalization information for normalizing the viewed image with reference to the reference-posted-material image. The reference-posted-material image compared for the generation of normalization information is the reference-posted-material image for the poster determined in S705 as being captured within the predetermined area in the viewed image. Images in which a poster and a peripheral region of the poster are captured, even though images of the same poster and peripheral region, become different images depending on the relative positions of the poster and the image-capturing unit 404 when an image of the poster is captured, differences in the characteristics of the image-capturing unit 404 among different types of the portable terminal device 120, differences in the light source conditions, etc. Thus, if a viewed image is merely compared with a viewed image already determined as being valid, there is a high possibility that the commonality between these images is low even if both are images of posted material posted in the same place and that these images are not determined as images captured in the same place. Even in the case where there are differences in the characteristics of the image-capturing unit 404 and differences in the light source conditions, the geometric and photometric relationships between the posted-material image and the peripheral image are fixed. Thus, in the present invention, a viewed image is normalized with reference to a reference-posted-material image, thereby effectively excluding a reduction in commonality due to differences in the image-capturing environment.

In this embodiment, geometric normalization and photometric normalization are executed as normalization. Normalization information for the geometric normalization includes geometric correction information identifying the geometric relationship between the poster image portion and the peripheral image portion in a viewed image. As described earlier, in this embodiment, the position of the portable terminal device 120 is guided when capturing an image of a poster so that the poster in the captured image will be placed at a predetermined position, i.e., geometric normalization is performed. However, in the case where complete matching between the characteristic points of the reference-posted-material image and the characteristic points of the captured image is not required, the position of the poster in a viewed image is not completely fixed. Thus, the portable-terminal control unit 401 compares the viewed image with the reference-posted-material image to identify the position of the poster image in the viewed image, thereby generating geometric correction information.

Specifically, the viewed image is compared with the reference-posted-material images for posters, stored in the portable-terminal storage unit 406, by way of key point matching to identify the position of the poster portion in the predetermined area. Then, position information identifying the position of the poster portion in the viewed image is generated as geometric correction information. The position information includes the coordinates (x, y) of the lower left end of the poster portion in the viewed image as well as the width (w) and height (h) of the poster portion.

Normalization information for the photometric normalization includes optical correction information obtained by computing the luminance and color differences between poster images in the reference-posted-material image and the viewed image. By generating the optical correction information, it becomes possible to determine whether or not the viewed image is valid even if there are differences in the characteristics of the image-capturing unit 404 among different types of the portable terminal device 120 and differences in the light source conditions.

In this embodiment, in order to generate the photometric correction information, a poster image Q obtained by extracting the poster portion from the viewed image is generated on the basis of the above-described position information serving as the geometric correction information. Then, the average luminance difference between the generated poster image Q and a reference-posted-material image T for the poster, stored in the storage unit 406, is calculated as a real value in the range of −1 to 1. This average luminance difference averageBrightnessDiff(T, Q) is defined as follows.

{Formula 1}

$$averageBrightnessDiff(T, Q) := \frac{\sum_{i=0}^{N-1} brightness(T_i) - brightness(Q_i)}{N} \quad (1)$$

Here, $T_i$ signifies the i-th pixel in the reference-posted-material image T, and $Q_i$ signifies the i-th pixel in the poster image Q extracted from the viewed image. brightness( ) is a function for calculating the luminance of a pixel given as an argument. N signifies the total number of pixels in an image. Preferably, images that are passed to this function should be normalized so as to have the same number of pixels.

Furthermore, for the calculation of color differences, it is possible to use the Godlove color-difference formula (Godlove, I. H.: Improved Color-Difference Formula, with Applications to the Perceptibility and Acceptability of Fadings, Journal of the Optical Society of America, 41(11), pp. 760-770, (1951)) or CIE2000 (Luo, M. R., Cui, G., & Rigg, B., "The development of the CIE 2000 colour-difference formula: CIEDE2000", Color Research & Application, Volume 26, Issue 5, October 2001, pp. 340-350, DOI: 10.1002/col.1049), which are color distance systems in a color space having uniformity. For example, the Godlove color-difference formula $\Delta_{godlove}$, generally known as the distance in an HSV space, can be defined as follows.

{Formula 2}

$$\Delta_{godlove} := \frac{2S_1 S_2 \left(1 - \cos\left(2\pi \frac{|H_1 - H_2|}{100}\right)\right) + (|S_1 - S_2|)^2 + (4|V_1 - V_2|)^2}{2} \quad (2)$$

By using this color-difference formula, the average color difference averageColorDiff(T, Q) between the reference-posted-material image T and the poster image Q extracted from the viewed image can be defined as follows.

{Formula 3}

$$averageColorDiff(T, Q) := \frac{\sum_{i=0}^{N-1} \Delta_{godlove}(T_i, Q_i)}{N} \quad (3)$$

As described earlier, in this embodiment, normalization information includes geometric correction information and photometric correction information. The position information of a poster portion in the viewed image is used as the geometric correction information, and the average luminance difference averageBrightnessDiff(T, Q) and the average color difference averageColorDiff(T, Q) are used as the photometric correction information. Alternatively, only one of the geometric correction information and the photometric correction information may be included as normalization information, or only one of luminance correction information and color correction information may be included as photometric correction information.

Next, the control unit 401 of the portable terminal device 120 sends a viewing confirmation request to the server 130 via the network 110 by using the communication unit 407 (S710). The viewing confirmation request includes the user ID identifying the user, the posted-material ID of the reference-posted-material image, the viewed image, the normalization information, and the portable-terminal position information. The posted-material ID of the reference-posted-material image is the posted-material ID associated with the reference-posted-material image for the poster determined in S705 as being captured within the predetermined area of the viewed image.

Figure 9:
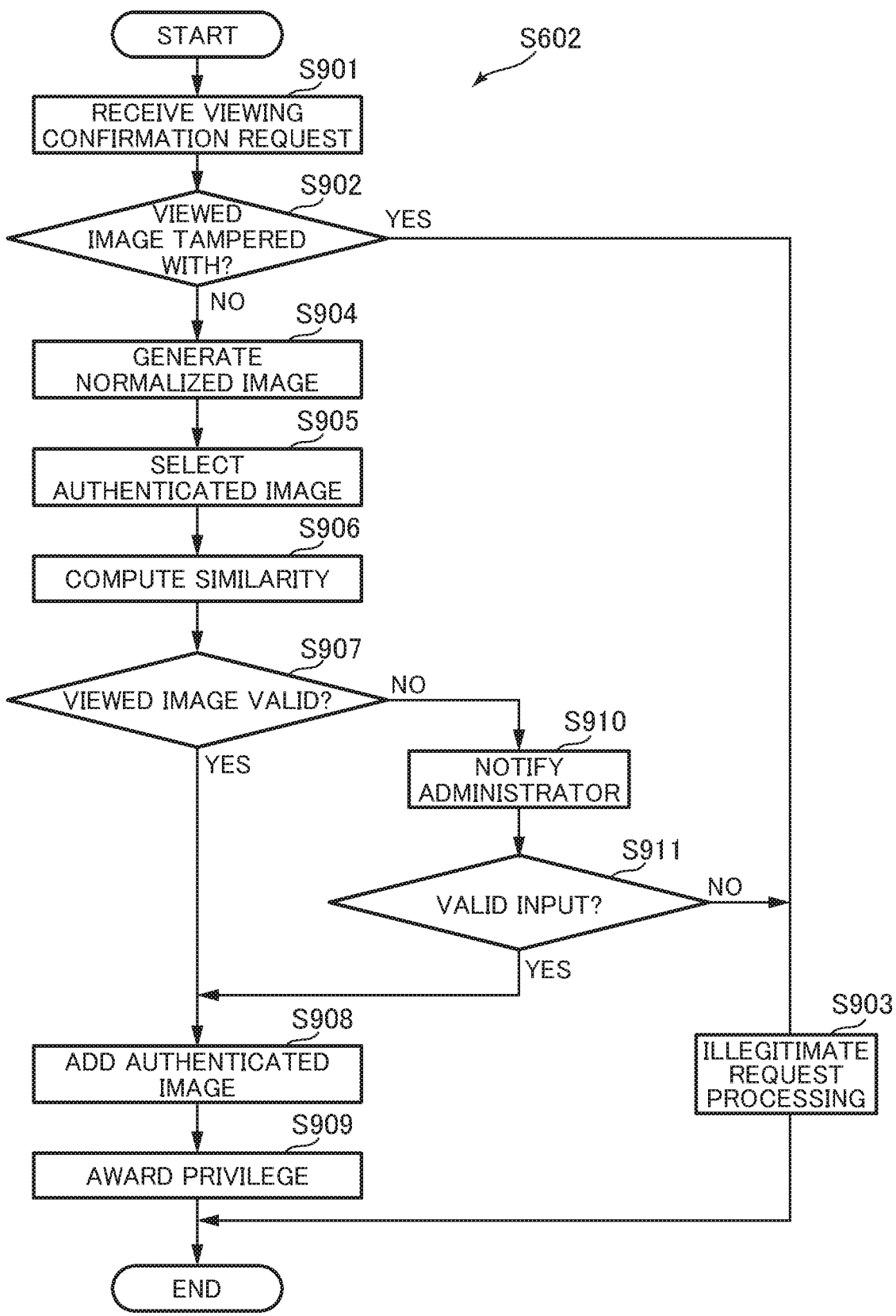
FIG. 9 is a flowchart showing information processing by the server according to the embodiment of the present invention.

Next, specific processing in the viewing confirmation processing (S602) executed by the server 130 will be described with reference to a flowchart shown in FIG. 9. In this embodiment, detection of an act of cheating, i.e., an act of attempting to obtain a privilege by issuing a viewing confirmation request with a copied or tampered image without actually viewing a poster, is executed in two separate phases.

In the first phase, illegitimate tampering of a viewed image is detected. In the second stage, viewed images having outlier values or excessively similar values are detected by using one or more authenticated images stored in the server, thereby detecting viewed images that are not images captured in posted places and viewed images that are likely to have been obtained illegitimately through coping or the like of other viewed images.

In S901, the server 130 receives the viewing confirmation request sent from the portable terminal device 120 via the communication unit 507. Then, the server 130 validates whether the viewed image included in the received viewing confirmation request has not been illegitimately tampered with (S902). Various methods are known as methods for validating whether or not an image has been illegitimately tampered with, as described in A. E. Dirik and N. Memon, "Image tamper detection based on demosaicing artifacts," 2009 16th IEEE International Conference on Image Processing (ICIP), Cairo, 2009, pp. 1497-1500 and Minati Mishra, Flt. Lt. Dr. M. C. Adhikary, "Digital Image Tamper Detection Techniques—A Comprehensive Study," International Journal of Computer Science and Business Informatics, Vol. 2, No. 1. ISSN: 1694-2108, June 2013. In this invention, any method for validating whether or not an image has been illegitimately tampered with may be employed.

In the case where it is determined that the viewed image has been illegitimately tampered with, the viewing confirmation request is considered as an illegitimate request based on illegitimate viewing, and illegitimate request processing is executed (S903). For example, on the basis of the user ID included in the viewing confirmation request, the online game account of the corresponding user is disabled.

In the case where it is determined that the viewed image has not been illegitimately tampered with, the viewed image is normalized on the basis of the normalization information included in the viewing confirmation request to generate a normalized image (S904). By normalizing the viewed image, a reduction in commonality due to differences in the image-capturing environment is effectively excluded. In this embodiment, geometric normalization is performed on the basis of the position information included in the normalization information and serving as geometric correction information. As described earlier, the position information includes the coordinates (x, y) of the lower left end of the poster portion in the viewed image as well as the width (w) and height (h) of the poster portion. The server control unit 501 performs geometric normalization by extracting the image other than the poster from the viewed image, i.e., extracting the peripheral image of the poster, on the basis of the position information.

Then, the extracted peripheral image is subjected to photometric normalization on the basis of the photometric correction information included in the normalization information. Photometric normalization can be divided into luminance correction and color correction. In the luminance correction, each of the pixels of the peripheral image is corrected on the basis of the following formula:

{Formula 4}

$$brightnessCompensation(r, g, b, BC) := \begin{pmatrix} r + BC \\ g + BC \\ b + BC \end{pmatrix} \quad (4)$$

Here, r, g, and b signify the RGB values of a specific pixel of the peripheral image to be corrected, and the individual elements of a matrix obtained with this function brightnessCompensation(r, g, b, BC) are used as luminance-corrected values of r, g, and b. Preferably, the results of computation of r, g, and b should be saturated with an upper limit value of 255 and a lower limit value of 0. BC signifies a coefficient for luminance correction, which is a value obtained with the average luminance difference averageBrightnessDiff(T, Q), described earlier, in this embodiment.

The color correction is performed by calculating a distance and a direction of movement (vector) in the color space on the basis of averageColorDiff(T, Q) and using a feature vector combined with that vector.

Then, one or more authenticated images corresponding to the normalized image are selected and read from the server storage unit 506 (S905). An authenticated image is an image based on an image determined as being valid as a viewed image of posted material posted in a predetermined posted place. In this embodiment, an authenticated image is a normalized image obtained by subjecting a viewed image determined as a valid image to the normalization processing described in relation to S904. Authenticated images include peripheral images of posters and thus become different images among the individual posted places even if the posted materials are of the same kind. Furthermore, even in the same posted place, authenticated images become different depending on the image-capturing time, etc. while maintaining certain similarity. Alternatively, authenticated images may be images based on images viewed and captured in advance in posted places by an administrator of the system. Furthermore, as will be described later, it is possible to increase the authenticated images stored in the server storage unit 506 by registering new authenticated images on the basis of images determined as being valid among viewed images sent from users. The authenticated images are stored in the server storage unit 506 in association with posted-material IDs and position information. The position information is information indicating the relevant posted place and includes a latitude and a longitude in this embodiment. As the position information of a posted place, the portable-terminal position information obtained by the portable terminal device 120 when a viewed image was captured may be used, or the position information of an already stored authenticated image may be used. The position information of an authenticated image that is stored initially may be entered by the administrator.

The server control unit 501 selects one or more authenticated images corresponding to the viewing confirmation request on the basis of the posted-material ID and position information included in the viewing confirmation request. For example, among the authenticated images associated with the same posted-material ID as the posted-material ID included in the viewing confirmation request, authenticated images associated with position information including latitudes and longitudes having differences within a predetermined value compared with the latitude and longitude in the portable-terminal position information are selected. Although the accuracy of the viewing confirmation processing improves as the number of authenticated images that are selected increases, it is possible to execute the viewing confirmation processing even with a single authenticated image.

Figure 10:
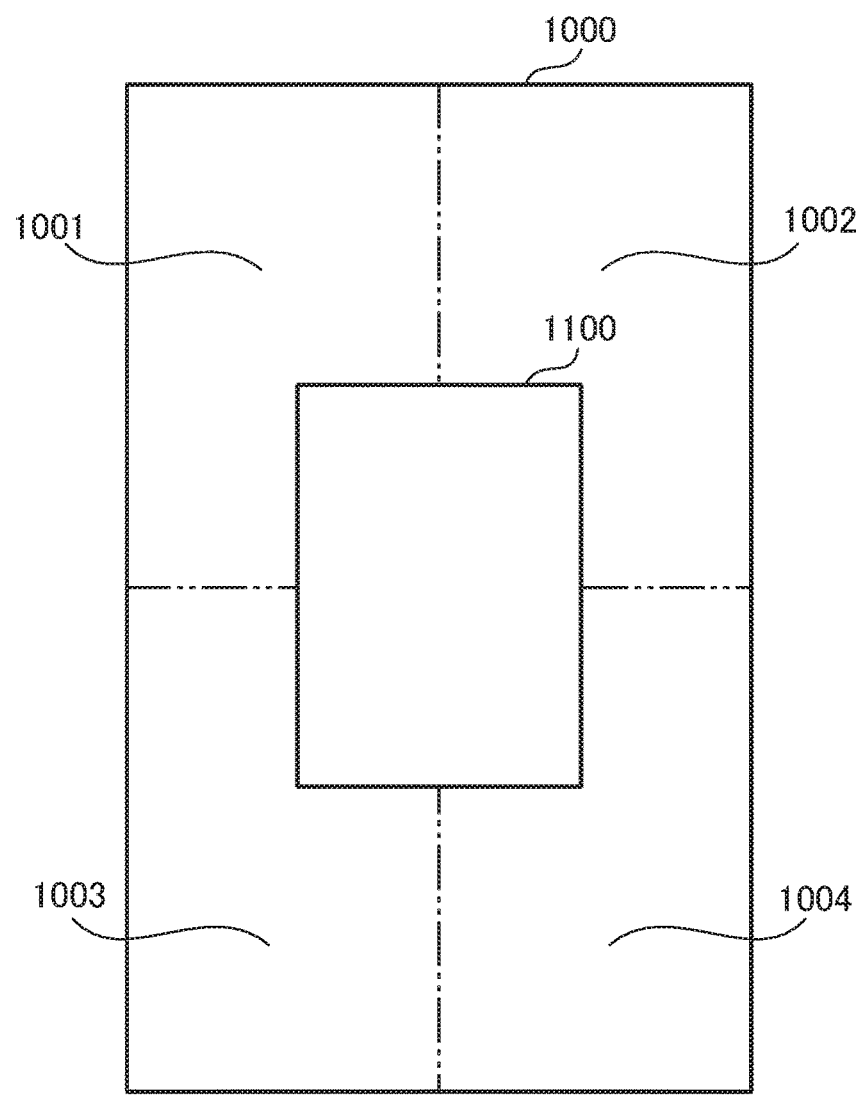
FIG. 10 is an illustration showing division of a normalized image according to the embodiment of the present invention.

Then, the similarities between the normalized image and the selected authenticated images are computed (S906). In this similarity computation, the normalized image is divided into a plurality of regions, and color information is analyzed on a per-region basis. The regional division and color information analysis are executed in similar manners also for the authenticated images stored in the server storage unit 506, and the results are stored in advance in the server storage unit 506. In the division of the normalized image, for example, as shown in FIG. 10, it is possible to divide the normalized image excluding a poster portion 1100 into four regions 1001 to 1004. An image I that has been subjected to color analysis can be defined as follows.

{Formula 5}

$$I := \{r_0, r_1, r_2, \ldots, r_j, \ldots, r_{J-1}\} \tag{5}$$

{Formula 6}

$$r_j : \{h_0, h_1, \ldots, h_b, \ldots, h_{B-1}\} \tag{6}$$

Here, $r_j$ signifies a histogram for the j-th divided region of the image I, and J signifies the number of regions. $h_b$ signifies the b-th value of the histogram, and B signifies the number of bins. As feature quantities for the histogram $r_j$, various feature quantities may be used. For example, a luminance histogram having values of 0 to 255 may be adopted, or a color histogram having values of 0 to 255 separately for R, G, and B may be adopted. Alternatively, a histogram representing the area ratios after performing clustering to a specific color set may be adopted, or texture feature quantities may be used instead of using color information.

Then, the similarities between the normalized image and the selected authenticated images are computed. In this embodiment, the distance distance(Q, M) indicating the similarity between a normalized image Q and an authenticated image M is defined as follows. distance(Q, M) is a function that returns a real value in the range of 0 to 1.

{Formula 7}

$$\text{distance}(Q, M) := \frac{\sqrt{\sum_{j=0}^{J-1} \left( \frac{\sum_{b=0}^{B-1} M_{[0+j,b]} - Q_{[j,b]}}{2} \right)^2}}{\sqrt{B}} \tag{7}$$

Here, $Q_{[0+j, b]}$ signifies the b-th value in the histogram for the j-th region of the normalized image Q, and $M_{[0+j, b]}$ signifies the b-th value in the histogram for the j-th region of the authenticated image M. B signifies the number of bins of the histograms for the normalized image Q and the authenticated image M, and J signifies the number of regions. This function employs the difference value between color histograms (histogram intersection), given in formula (8), for the evaluation of matching between regions.

{Formula 8}

$$\frac{\sum_{b=0}^{B-1} M_{[0+j,b]} - Q_{[j,b]}}{2} \tag{8}$$

As the difference value between color histograms in this embodiment, the difference between histograms are computed for each pair of corresponding regions of the normalized image Q and the authenticated image M. The $L^1$ norm of the histogram difference is 1. Thus, since the maximum histogram difference is 2, the value is normalized to the range of 0 to 1 by using 2 as the denominator. Since the square of this histogram difference is obtained for each of the regions constituting the peripheral image, it is possible to obtain a distance indicating similarity in the form of the square root of the sum of those values. The formula of distance(Q, M) is an application of root mean squared error (RMSE) to the computation of a distance indicating a color difference between images, where RMSE is an index indicating the standard magnitude of the difference between a standard query and a search target by using the distances between individual data values and other data values. As other example methods, instead of the histogram difference, it would be obvious that implementation is possible by using other functions such as matching evaluation functions based on Earth Mover's Distance ([Ofir Pele and Michael Werman. 2008. A Linear Time Histogram Metric for Improved SIFT Matching. In Proceedings of the 10th European Conference on Computer Vision: Part III (ECCV '08), David Forsyth, Philip Torr, and Andrew Zisserman (Eds.). Springer-Verlag, Berlin, Heidelberg, 495-508 and Ofir Pele and Michael Werman, Fast and Robust Earth Mover's Distances, In Proceedings of the IEEE 12th International Conference on Computer Vision, November 2009).

By the method described above, the distance distance(Q, M) of the normalized image to each of the one or selected authenticated images M is computed. It is indicated that these images are maximally similar in the case where the distance is 0 and that these images are less similar as the distance becomes greater. Furthermore, the average distance averageDistance(Q) of the computed distances is defined as follows.

{Formula 9}

$$averageDistance(Q) := \frac{\sum_{s=0}^{S-1} distance(Q, M_s)}{S} \quad (9)$$

Here, S signifies the number of selected authenticated images, and $M_s$ signifies the s-th selected authenticated image. In the case where the average distance is greater than an outlier threshold, the viewed image corresponding to the normalized image is determined as being illegitimate. Furthermore, the viewed image is also determined as being illegitimate in the case where the distance distance(Q, M) from one of the authenticated images is less than or equal to an excessive similarity threshold. That is, the viewed image is determined as being valid in the case where the average distance is less than or equal to the outlier threshold and the distances with all the authenticated images are greater than the excessive similarity threshold.

Although there should be commonality between images including the backgrounds of a poster posted in the same place, there is a high possibility of being a copy of another viewed image in the case where the similarity is excessive. The outlier threshold is the maximum value of the distance with which two images are considered as images including the backgrounds of a poster posted in the same place. In the case where the distance is greater than the outlier threshold, since the commonality is low, the images are not considered as images including the backgrounds of a poster posted in the same place. The excessive similarity threshold is the minimum value of the distance with which one viewed image is considered as not being a copy of the other. In the case where the distance is less than the excessive similarity threshold, since the similarity is excessive, one is considered as a copy of the other.

Although this embodiment has been described in the context of the case where the normalized image and the authenticated images are divided into four regions, it is possible to embody the present invention without performing division.

As another example, it is also possible to use the average distance to a set of center-of-gravity images among the authenticated images instead of using the average distance to all the authenticated images. The distances between authenticated images for a predetermined posted place are computed in advance, and a set of images having short average distances is considered as a set of center-of-gravity images for that posted place. For example, a distance matrix including elements indicating the distances defined between two authenticated images is created, as shown in Table 1. When there are P images serving as authenticated images, the distance matrix becomes a P×P symmetrical matrix including the distances between images as elements thereof. The diagonal elements represent the distances between the same image and thus all become 0. Table 1 additionally includes the average distances at the rightmost column.

TABLE 1

|  | Image 1 | Image 2 | . . . | Image L | Average distance |
|---|---|---|---|---|---|
| Image 1 | 0 | 0.6 | . . . | 0.9 | 0.7 |
| Image 2 | 0.6 | 0 | . . . | 0.2 | 0.4 |
| . . . | . . . | . . . | 0 | . . . | . . . |
| Image L | 0.9 | 0.2 | . . . | 0 | 0.2 |

Z images having the least average distance on the basis of this distance matrix are extracted and are considered as a set of center-of-gravity images. The average distance between the normalized image Q and the authenticated images constituting the individual elements of an array G storing the set of center-of-gravity images can be obtained according to the following formula.

{Formula 10}

$$averageGravityDistance(Q, G) := \frac{\sum_{z=0}^{Z-1} distance(Q, G_z)}{Z} \quad (10)$$

Here, $G_z$ signifies the z-th authenticated image in the array G. The extraction of the set of center-of-gravity images can be executed as the selection of authenticated images in S905. That is, with this formula, the average distance between the normalized image Q and the images selected as the center of gravity is obtained. With this method, since comparison operation is performed only with the set of images constituting the center of gravity, it is possible to reduce the amount of calculation, thereby increasing the speed of the determination processing.

Figure 11:
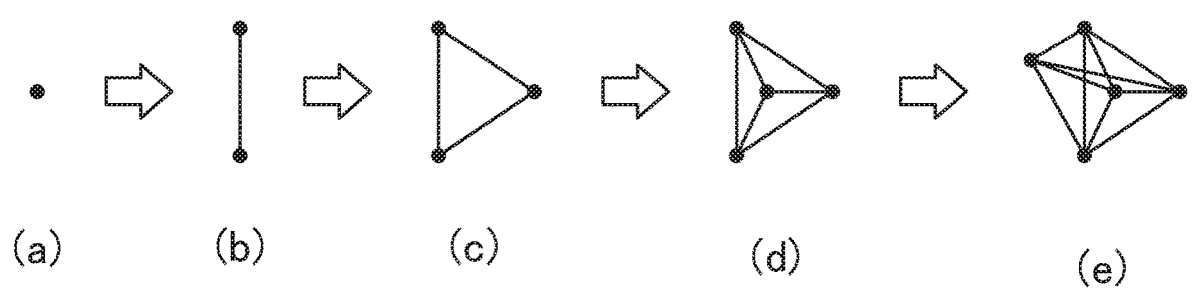
FIG. 11 is an illustration showing the concept of the distance between images according to the embodiment of the present invention.

FIG. 11 shows a visualization of the distance between images in the present invention. In the figure, each single point corresponds to a single image. Part (a) shows a state in which there is only one authenticated image stored in the server storage unit 506, and it becomes possible to compute mutual distances, as shown in Table 1, as the number of registered authenticated images increases, as indicated in parts (b) to (e). Although it is possible to compute the distance of a viewed image with only one registered authenticated image, the effects of noise are alleviated as the number of registered authenticated images increases, which enables similarity determination with higher accuracy.

As a modification, it is also possible to compute similarity by using the distance weightedDistance(Q, M) weighted for the individual divided regions. The weighted distance weightedDistance(Q, M) between a normalized image Q and an authenticated image M stored in the server storage unit 506 is a function that returns a real value in the range of 0 to 1 and can be defined as follows.

{Formula 11}

$$weightedDistance(Q, M) := \sqrt{\sum_{j=0}^{J-1}(dist(Q_j, M_j) \cdot w_j)^2} \quad (11)$$

Here, $dist(Q_j, M_j)$ is a function for calculating the similarity between the j-th regions, for example, a function for calculating the distance between the j-th regions. $Q_j$ signifies the normalized image Q in the j-th region, $M_j$ signifies the authenticated image in the j-th region, and $w_j$ signifies a weight for the j-th regions. The weight is obtained by comparing corresponding regions of authenticated images associated with the same position information among the authenticated images stored in the server storage unit 506 and calculating the distance matrix for each of the images. Specifically, the distances between the regions of the individual images are calculated to generate a distance matrix by using a matching evaluation function, such as the color-histogram difference value described earlier. By obtaining the average distance in the distance matrix, peripheral regions that are susceptible to change and peripheral regions that are insusceptible to change in the place where the poster is posted are detected, and weights are set according to the degrees of insusceptibility to change (variations in the similarity between images). Regions having long average distances and low cohesiveness (regions having variations in the similarity between images) are regions that are susceptible to change, and regions having short average distances and high cohesiveness (regions not having variations in the similarity between images) are regions that are insusceptible to change. High weights are assigned to the regions insusceptible to change, and low weights are assigned to the regions susceptible to change.

FIG. 12 schematically illustrates the distances between authenticated images in the individual regions. In parts (a) to (d), the individual authenticated images in the top left region (a), the top right region (b), the bottom left region (c), and the bottom right region (d) are mapped individually to indicate the mutual distance relationships. In the top left region (a), the individual authenticated images are close to each other, which indicates that the average distance is short and thus this region is a region having high cohesiveness (region not having variations in the similarity between images). Meanwhile, in the bottom right region (d), the points to which the authenticated images are mapped are dispersed, which indicates that the average distance is long and thus this region is a region having low cohesiveness (region having variations in the similarity between images).

The variations in the similarity between authenticated images in each region depend on the nature of the place where the peripheral region of the poster is located. For example, suppose that the poster is posted at a side of an entrance of a department store, the entrance of the department stored is captured in the right peripheral portion of the poster, and only a wall of the department store is captured in the left peripheral portion thereof. Since customers of the department store frequently come in and go out through the entrance of the department store, the image of the right peripheral portion considerably changes each time an image is captured. Meanwhile, because only the brightness or the like changes with the weather and time as for the wall of the department store, the image of the left peripheral portion does not considerably change each time an image is captured. The change becomes very small particularly if photometric normalization is performed.

Also in this modification, in the case of a region susceptible to change, even if the distance between the normalized image and the authenticated image is long, this is considered as being attributable to the intrinsic susceptibility of the region to change, for example, being attributable to a passerby being captured, and thus the effect of the distance in such a region on the similarity determination as a whole is made lower. Meanwhile, in the case where the distance between the normalized image and the authenticated image in a region with small change is long, it is likely that this is attributable to a difference meaningful for the similarity determination, for example, attributable to being images posted in different places, and thus the weight is made higher. By assigning weights on the basis of the degrees of susceptibility of the individual regions to change, as described above, it becomes possible to determine the validity of a viewed image more accurately.

In the case where the viewed image is determined as being valid in S907, in S908, the normalized image of the viewed image is registered as an authenticated image in the server storage unit 506 in association with the position information of the place where the poster is posted, and is used as an authenticated image for subsequent viewing confirmation requests. This makes it possible for the system to grow autonomously. In S909, processing for awarding a privilege to the user who has sent the viewed image is executed on the basis of the user ID. For example, points in an online game being played by the user are awarded to the account of the user.

In the case where the viewed image is determined as being illegitimate in S907, the administrator of the server 130 is notified that the viewed image has been determined as being illegitimate (S910). Then, the administrator is made to determine by the naked eye whether or not the viewed image is illegitimate. This serves to prevent a viewed image that is actually valid from incorrectly being determined as being illegitimate. In particular, in the case where the number of authenticated images stored in the server storage unit 506 is small, the reliability of determination based on similarity is low, and thus the redetermination by the administrator is effective.

Then, if the viewed image is confirmed by the administrator as being an illegitimate image, the server input unit 503 accepts an input indicating an illegitimate image (S911), and illegitimate request processing is executed in S903. Meanwhile, if the viewed image is determined by the administrator as a valid image, the server input unit 503 accepts an input indicating a valid image (S911), the normalized image is registered as a new authenticated image in S908, and then privilege awarding processing (S909) is executed.

As another example, in the case where the viewed image is determined as not being a valid image in S907, illegitimate request processing (S903) may be executed without notifying the administrator. As yet another example, S904 to S909 may be executed as batch processing in which a plurality of viewing confirmation requests accumulated at regular intervals are processed as a batch. In this case, for a viewing confirmation request with which it is determined that the viewed image has not been illegitimately tampered with, the viewing confirmation is considered as being valid, and the privilege awarding processing is executed, and in the case where the viewed image is determined as being illegitimate in the batch processing, illegitimate request processing, such as disabling the account, is executed (S903). This batch processing serves to improve the response performance to users.

Although both geometric normalization and photometric normalization are performed in this embodiment, it would be obvious that it is also possible to embody the present invention with either one of these types of normalization. Furthermore, as for photometric normalization, it is possible to perform either one of luminance-based normalization and color-based normalization. Furthermore, normalized images and authenticated images may be images including posted materials.

Although this embodiment has been described in the context of the case where two or more kinds of posted-material image are stored in the portable-terminal storage unit and the server storage unit, processing relating to posted-material IDs may be omitted in the case where only one kind of posted-material image is stored. Furthermore, processing regarding position information may also be omitted in the case where there is only one posted place. It is also possible to obtain a viewed image by associating position information with reference-posted-material images and comparing an image captured by a portable terminal device only with reference-posted-material images located in the vicinity of the position of the portable terminal. Although the above embodiment has been described in the context of examples where the distance or average distance is used to represent the similarity between images, other criteria may be used as long as it is possible to evaluate the similarity between images.

The processing or operation described above may be modified freely as long as no inconsistency arises in the processing or operation. Furthermore, the embodiments described above are examples for explaining the present invention, and the present invention is not limited to those embodiments. The present invention may be embodied in various forms not departing from the gist thereof. Furthermore, the advantages described in the context of the embodiments are merely a list of most preferred advantages arising from the present invention, and the advantages of the present invention are not limited to those described in the context of the embodiments.

REFERENCE SIGNS LIST

100 Viewing confirmation system
110 Network
120 Portable terminal device
130 Server
201 Processing device
202 Display device
203 Input device
204 Image-capturing device
205 Position-information obtaining device
206 Storage device
207 Communication device
208 Bus
209 Programs
301 Processing device
302 Display device
303 Input device
306 Storage device
307 Communication device
308 Bus
309 Programs
401 Portable-terminal control unit
402 Portable-terminal display unit
403 Portable-terminal input unit
404 Image-capturing unit
405 Position-information obtaining unit
406 Portable-terminal storage unit
407 Portable-terminal communication unit
501 Server control unit
502 Server display unit
503 Server input unit
506 Server storage unit
506 Server storage
507 Server communication unit
800 Display screen
801 Frame
802 Poster
803 Image-capturing region
805 Periphery of poster
1000 Normalized image
1001 Divided region
1002 Divided region
1003 Divided region
1004 Divided region
1100 Poster portion

The invention claimed is:

1. A system used to confirm that a user of a portable terminal device has viewed posted material posted in a plurality of places by visiting one of the posted places, the system being characterized by comprising the portable terminal device and a server, the portable terminal device including a portable-terminal control unit, a portable-terminal communication unit, an image capturing unit, a portable-terminal storage unit, and a position-information obtaining unit, and the server including a server control unit, a server communication unit, and a server storage unit that stores authenticated images about the posted material in the individual posted places in association with position information of the posted places, and characterized in that:

the portable-terminal control unit
obtains portable-terminal position information by using the position-information obtaining unit;
compares an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space;
captures a viewed image, which is an image of a space including the posted material captured within the area as well as a peripheral portion of the posted material, if it is determined that the posted material is captured within the area;
generates, by comparing the image of the posted material in the viewed image with the reference-posted-material image for the posted material, normalization information for normalizing the viewed image with reference to the reference-posted-material image; and
sends a viewing confirmation request including the viewed image, the normalization information, and the portable-terminal position information to the server by using the portable-terminal communication unit, and the server control unit
receives the viewing confirmation request by using the server communication unit;
determines whether or not the viewed image included in the viewing confirmation request has been tampered with;
determines the viewing by the user as illegitimate viewing in the case where it is determined that the viewed image has been tampered with;
generates a normalized image obtained by normalizing the viewed image on the basis of the normalization information in the case where it is determined that the viewed image has not been tampered with;
selects one or more authenticated images corresponding to the viewed image from among the authenticated images stored in the server storage unit, on the basis of the portable-terminal position information and the position information associated with the authenticated images;
compares the normalized image with the one or more selected authenticated images to compute similarities between the normalized image and the authenticated images;
determines whether or not the viewed image is valid on the basis of the similarities;
determines the viewing by the user as valid viewing in the case where it is determined that the viewed image is valid; and
determines the viewing by the user as illegitimate viewing in the case where it is determined that the viewed image is not valid.

2. A system according to claim 1, characterized in that:
the generation of the normalization information by the portable-terminal control unit includes comparing the viewed image with the reference-posted-material image and generating position information indicating the position of the image of the posted material in the viewed image;
the normalization information includes the position information;
the authenticated images stored in the server storage unit are normalized images of peripheral portions of the posted, material; and
the normalization based on the normalization information by the server control unit includes extracting the image of the peripheral portion of the posted material from the viewed image on the basis of the position information of the posted material.

3. A system according to claim 1, characterized in that:
the generation of the normalization information by the portable-terminal control unit includes computing the luminance and color differences between the images of the posted material in the reference-posted-material image and the viewed image and generating photometric correction information based on the computed luminance and color differences;
the normalization information includes the photometric correction information; and
the generation of a normalized image by the server control unit on the basis of the normalization information includes correcting the luminance and colors of the viewed image on the basis of the photometric correction information.

4. A system according to claim 1, characterized in that:
the computation of the similarities between the normalized image and the authenticated images by the server control unit includes:
dividing each of the viewed image and the authenticated images into two or more regions;
computing the similarities between individual corresponding regions of the viewed image and the authenticated images as divided; and
computing the similarities between the viewed image and the authenticated images on the basis of the similarities of the individual regions and weights assigned to the individual regions, and
the weights are determined on the basis of variations in similarity between the corresponding regions among the authenticated images.

5. A system according to claim 1, characterized in that the server control unit stores the normalized image as an authenticated image in the server storage unit in association with the position information of the posted place in the case where it is determined that the viewed image is valid on the basis of the similarities.

6. A system according to claim 1, characterized in that:
the portable-terminal storage unit stores images of two or more kinds of posted material in association with posted-material identification information indicating the kinds of posted material;
the viewing confirmation request further includes the posted-material identification information of the posted material captured within the area;
the authenticated images stored in the server storage unit are associated with the posted-material identification information; and
the selection of one or more authenticated images corresponding to the viewed image from among the authenticated images stored in the server storage unit includes selecting authenticated images associated with the posted-material identification information included in the viewing confirmation request.

7. A portable terminal device used to confirm that a user of the portable terminal device has viewed posted material posted in a plurality of places by visiting one of the posted places, the portable terminal device including a portable-terminal control unit, a portable-terminal communication unit, an image capturing unit, a portable-terminal storage unit, and a position-information obtaining unit, the portable terminal device being characterized in that the portable-terminal control unit:
obtains portable-terminal position information by using the position-information obtaining unit;
compares an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space;
captures a viewed image, which is an image of a space including the posted material captured within the area as well as a peripheral portion of the posted material, if it is determined that the posted material is captured within the area;
generates, by comparing the image of the posted material in the viewed image with the reference-posted-material image for the posted material, normalization information for normalizing the viewed image with reference to the reference-posted-material image; and sends a viewing confirmation request including the viewed image, the normalization information, and the portable-terminal position information to a server by using the portable-terminal communication unit.

8. A server used to confirm that a user of a portable terminal device has viewed posted material posted in a plurality of places by visiting one of the posted places, wherein the portable terminal device sends a viewing confirmation request including a viewed image, normalization information, and portable-terminal position information, the viewed image includes an image of posted material posted in a predetermined place as well as a peripheral portion thereof, the normalization information is information for normalizing the viewed image, the portable-terminal position information is information indicating the position of the portable terminal device, the server including a server control unit, a server communication unit, and a server storage unit that stores authenticated images about the posted material in the individual posted places in association with position information of the posted places, the server being characterized in that the server control unit:

receives a viewing confirmation request including the viewed image, the normalization information, and the portable-terminal position information by using the server communication unit;

determines whether or not the viewed image included in the viewing confirmation request has been tampered with;

determines the viewing by the user as illegitimate viewing in the case where it is determined that the viewed image has been tampered with;

generates a normalized image obtained by normalizing the viewed image on the basis of the normalization information in the case where it is determined that the viewed image has not been tampered with;

selects one or more authenticated images corresponding to the viewed image from among the authenticated images stored in the server storage unit, on the basis of the portable-terminal position information and the position information associated with the authenticated images;

compares the normalized image with the one or more selected authenticated images to compute similarities between the normalized image and the authenticated images;

determines whether or not the viewed image is valid on the basis of the similarities, determines the viewing by the user as valid viewing in the case where it is determined that the viewed image is valid, and determines the viewing by the user as illegitimate viewing in the case where it is determined that the viewed image is not valid.

9. A non-transitory computer-readable medium storing a program used to confirm that a user of a portable terminal device has viewed posted material posted in a plurality of places by visiting one of the posted places, the program causing the portable terminal device, including a portable-terminal communication unit, an image capturing unit, a portable-terminal storage unit, and a position-information obtaining unit, to:

obtain portable-terminal position information by using the position-information obtaining unit;

compare an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space;

capture a viewed image, which is an image of a space including the posted material captured within the area as well as a peripheral portion of the posted material, if it is determined that the posted material is captured within the area;

generate, by comparing the image of the posted material in the viewed image with the reference-posted-material image for the posted material, normalization information for normalizing the viewed image with reference to the reference-posted-material image; and send a viewing confirmation request including the viewed image, the normalization information, and the portable-terminal position information to a server by using the portable-terminal communication unit.

10. A non-transitory computer-readable medium storing a program used to confirm that a user of a portable terminal device has viewed posted material posted in a plurality of places by visiting one of the posted, places, wherein the portable terminal device sends a viewing confirmation request including a viewed image, normalization information, and portable-terminal position information, the viewed image includes an image of posted material posted in a predetermined place as well as a peripheral portion thereof, the normalization information is information for normalizing the viewed image, the portable-terminal position information is information indicating the position of the portable terminal device, and the program causing a server, including a server communication unit and a server storage unit that stores authenticated images about the posted material in the individual posted places in association with position information of the posted places, to:

receive a viewing confirmation request including the viewed image, the normalization information, and the portable-terminal position information by using the server communication unit;

determine whether or not the viewed image included in the viewing confirmation request has been tampered with;

determine the viewing by the user as illegitimate viewing in the case where it is determined that the viewed image has been tampered with;

generate a normalized image obtained by normalizing the viewed image on the basis of the normalization information in the case where it is determined that the viewed image has not been tampered with;

select one or more authenticated images corresponding to the viewed image from among the authenticated images stored in the server storage unit, on the basis of the portable-terminal position information and the position information associated with the authenticated images;

compare the normalized image with, the one or more selected authenticated images to compute similarities between the normalized image and the authenticated images;

determine whether or not the viewed image is valid on the basis of the similarities;

determine the viewing by the user as valid viewing in the case where it is determined that the viewed image is valid; and determine the viewing by the user as illegitimate viewing in the case where it is determined that the viewed image is not valid.

11. A method used to confirm that a user of a portable terminal device has viewed posted material posted in a plurality of places by visiting one of the posted places, the method being executed by the portable terminal device, including a portable-terminal communication unit, an image capturing unit, a portable-terminal storage unit, and a position-information obtaining unit, the method comprising:

obtaining portable-terminal position information by using the position-information obtaining unit;

comparing an image of a space captured by the image capturing unit with a reference-posted-material image stored in the portable-terminal storage unit, the reference-posted-material image being an image of posted material, thereby determining whether or not the posted material in the reference-posted-material image is captured within a predetermined area in the image of the captured space;

capturing a viewed image, which is an image of a space including the posted material captured within the area as well as a peripheral portion of the posted material, if it is determined that the posted material is captured within the area;

generating, by comparing the image of the posted material in the viewed image with the reference-posted-material image for the posted material, normalization information for normalizing the viewed image with reference to the reference-posted-material image; and sending a viewing confirmation request including the viewed image, the normalization information, and the portable-terminal position information to a server by using the portable-terminal communication unit.

12. A method used to confirm that a user of a portable terminal device has viewed posted material posted in a plurality of places by visiting one of the posted places, the method being executed by a server, wherein the portable terminal device sends a viewing confirmation request including a viewed image, normalization information, and position information of the posted material included in the viewed image, the position information being based on portable-terminal position information, the viewed image includes an image of posted material posted in a predetermined place as well as a peripheral portion thereof, the normalization information is information for normalizing the viewed image, the portable-terminal position information is information indicating the position of the portable terminal device, and the server includes a server communication unit and a server storage unit that stores authenticated images about the posted material in the individual posted places in association with position information of the posted places, the method comprising:

receiving a viewing confirmation request including the viewed image, the normalization information, and the portable-terminal position information by using the server communication unit;

determining whether or not the viewed image included in the viewing confirmation request has been tampered with;

determining the viewing by the user as illegitimate viewing in the case where it is determined that the viewed image has been tampered with;

generating a normalized image obtained by normalizing the viewed image on the basis of the normalization information in the case where it is determined that the viewed image has not been tampered with;

selecting one or more authenticated images corresponding to the viewed image from among the authenticated images stored in the server storage unit, on the basis of the portable-terminal position information and the position information associated with the authenticated images;

comparing the normalized image with the one or more selected authenticated images to compute similarities between the normalized image and the authenticated images;

determining whether or not the viewed image is valid on the basis of the similarities;

determining the viewing by the user as valid viewing in the case where it is determined that the viewed image is valid; and determining the viewing by the user as illegitimate viewing in the case where it is determined that the viewed image is not valid.

* * * * *